United States Patent
Sun et al.

(10) Patent No.: US 11,932,298 B2
(45) Date of Patent: Mar. 19, 2024

(54) FOLDING CART

(71) Applicant: ZHEJIANG JIANSHENG LEISURE PRODUCTS CO., LTD, Zhejiang (CN)

(72) Inventors: Yuanru Sun, Zhejiang (CN); Jian He, Zhejiang (CN)

(73) Assignee: ZHEJIANG JIANSHENG LEISURE PRODUCTS CO., LTD, Zhejiang (CN)

(*) Notice: Subject to any disclaimer, the term of this patent is extended or adjusted under 35 U.S.C. 154(b) by 493 days.

(21) Appl. No.: 17/137,367

(22) Filed: Dec. 30, 2020

(65) Prior Publication Data
US 2021/0114643 A1 Apr. 22, 2021

Related U.S. Application Data

(63) Continuation-in-part of application No. PCT/CN2020/116444, filed on Sep. 21, 2020.

(30) Foreign Application Priority Data

Oct. 18, 2019 (CN) .......................... 201921755041.6

(51) Int. Cl.
*B62B 3/02* (2006.01)
*B62B 5/06* (2006.01)

(52) U.S. Cl.
CPC ................ *B62B 3/02* (2013.01); *B62B 5/067* (2013.01); *B62B 2205/02* (2013.01); *B62B 2205/06* (2013.01); *B62B 2205/26* (2013.01)

(58) Field of Classification Search
CPC ...... B62B 2205/06; B62B 5/067; B62B 3/007; B62B 3/02
See application file for complete search history.

(56) References Cited

U.S. PATENT DOCUMENTS

| | | | |
|---|---|---|---|
| 9,056,621 B1* | 6/2015 | Jin | B62B 3/027 |
| 9,145,154 B1* | 9/2015 | Horowitz | B62B 5/0013 |
| 9,211,897 B2* | 12/2015 | Yang | B62B 3/001 |
| 9,738,298 B1* | 8/2017 | Yang | B62B 3/025 |
| 10,040,470 B1* | 8/2018 | Horowitz | B62B 3/102 |
| 10,099,711 B1* | 10/2018 | Sun | B62B 3/007 |
| 10,399,586 B1* | 9/2019 | Huang | B62B 5/06 |
| 10,501,103 B1* | 12/2019 | Wang | B62B 3/007 |
| 10,633,010 B1* | 4/2020 | Zhang | B62B 3/025 |
| 10,836,418 B2* | 11/2020 | Zhu | B62B 3/025 |

(Continued)

*Primary Examiner* — Katy M Ebner
(74) *Attorney, Agent, or Firm* — JCIP GLOBAL INC.

(57) ABSTRACT

A folding cart includes a frame body and a handle mechanism. The frame body comprises a chassis, four lower hinged seats at four corners of the chassis, a front folding mechanism in front of the chassis, a rear folding mechanism behind the chassis and two side folding mechanisms on the side of the chassis. A bottom portion of the lower hinged seats is provided with wheels. The chassis is an X-shaped cross-hinged structure and has four end portions respectively hinged to the lower hinged seats. The side folding mechanism has at least one X-shaped cross-hinged rod assembly with upper ends hinged to the upper hinged seats and lower ends hinged to the lower hinged seats. The front folding mechanism and the rear folding mechanism respectively have at least one X-shaped cross-hinged rod assembly having two hinged cross rods.

15 Claims, 22 Drawing Sheets

(56) References Cited

U.S. PATENT DOCUMENTS

| | | | |
|---|---|---|---|
| 10,953,903 B1* | 3/2021 | Park | B62B 3/007 |
| 11,173,936 B1* | 11/2021 | Regev | B62B 3/108 |
| 11,225,277 B1* | 1/2022 | Sun | B62B 5/061 |
| 11,370,467 B1* | 6/2022 | Horowitz | B62B 3/007 |
| 11,572,091 B1* | 2/2023 | Wang | B62B 5/00 |
| 2010/0090444 A1* | 4/2010 | Chen | B62B 3/106 |
| | | | 280/651 |
| 2011/0204598 A1* | 8/2011 | Stevenson | B62B 3/02 |
| | | | 280/639 |
| 2018/0327011 A1* | 11/2018 | Horowitz | B62B 3/025 |
| 2021/0107548 A1* | 4/2021 | Wang | B62B 3/007 |
| 2021/0114643 A1* | 4/2021 | Sun | B62B 5/067 |
| 2021/0284216 A1* | 9/2021 | Sun | B62B 5/067 |
| 2021/0300450 A1* | 9/2021 | Yang | B62B 3/025 |
| 2022/0041199 A1* | 2/2022 | Tong | B62B 3/025 |
| 2022/0340183 A1* | 10/2022 | Sun | B62B 3/025 |
| 2023/0001973 A1* | 1/2023 | Frankel | B62B 3/003 |
| 2023/0094718 A1* | 3/2023 | Zhou | B62B 3/025 |
| | | | 280/651 |

* cited by examiner

FOLDING CART

CROSS-REFERENCE TO RELATED APPLICATION

This application is a continuation in part of international PCT application serial no. PCT/CN2020/116444, field on Sep. 21, 2020, which claims the priority benefit of China application no. 201921755041.6, filed on Oct. 18, 2019. The entirety of each of the above-mentioned patent applications is hereby incorporated by reference herein and made a part of this specification.

BACKGROUND

Technical Field

The present invention belongs to the field of cart and particularly relates to a folding cart.

Description of Related Art

The cart is a vehicle capable of loading a certain amount of articles, and is widely used in shopping, traveling, outdoor recreation, etc. The existing carts are generally fix-typed, which cannot be folded, and are not convenient to use.

SUMMARY

In order to make up for the deficiencies of the prior art, the present invention provides a technical solution of a folding cart.

The folding cart includes a frame body and a handle mechanism. The frame body includes a chassis, four lower hinged seats respectively at four corners of the chassis, a front folding mechanism in front of the chassis, a rear folding mechanism behind the chassis and two side folding mechanisms on a side of the chassis. A bottom portion of the lower hinged seat is provided with wheels. The chassis is of an X-shaped cross-hinged structure, and four ends of the chassis are respectively hinged to the four lower hinged seats. The side folding mechanism includes at least one X-shaped cross-hinged rod assembly, upper ends of both sides of the side folding mechanism are respectively hinged to upper hinged seats, and lower ends of both sides of the side folding mechanism are respectively hinged to the corresponding lower hinged seats. The front folding mechanism includes at least one X-shaped cross-hinged rod assembly, with upper ends of both sides respectively hinged to the corresponding upper hinged seats and lower ends of both sides are respectively hinged to the corresponding lower hinged seats. The rear folding mechanism includes at least one X-shaped cross-hinged rod assembly, with upper ends of both sides respectively hinged to the corresponding upper hinged seats and lower ends of both sides are respectively hinged to the corresponding lower hinged seats. The handle mechanism includes a lever, a lever hinged seat disposed on the lever, and pulling rods hinged to both sides of the lever hinged seat, wherein the two pulling rods are respectively hinged to the two lower hinged seats in front of the chassis, and the lever can drive the lever hinged seat to move upward. The X-shaped cross-hinged rod assembly of the front folding mechanism, of the rear folding mechanism, and of the side folding mechanism includes two hinged cross rods.

In an embodiment of the invention, the chassis includes two X-shaped cross-hinged structures, inner ends of left and right sides of the two X-shaped cross-hinged structures are jointly hinged to a first connecting piece, a middle part of the side folding mechanism is provided with a second connecting piece, outer ends of the X-shaped cross-hinged structures are universally hinged to the corresponding lower hinged seats, and when the folding cart is switched from an open state to a contracted state, the X-shaped cross-hinged structures can tilt and swing relative to the lower hinged seats, so that the two X-shaped cross-hinged structures are switched from the original horizontal state to a folded state, and the first connecting piece and the second connecting piece are switched from the original buckled state to a separated state.

In an embodiment of the invention, the first connecting piece is of a first spherical hinge structure, and the second connecting piece has a first accommodating groove for being buckled with a ball head of the first spherical hinge structure.

In an embodiment of the invention, a second spherical hinge structure is arranged at an outer end of each of the X-shaped cross-hinged structures, and a second accommodating groove for being universally hinged to a ball head of the second spherical hinge structure is arranged on each of the lower hinged seats.

In an embodiment of the invention, the lever is slidably inserted into the lever hinged seat, and a lower end of the lever is provided with a lever stopper, so that when the lever is pulled upward, the lever stopper can drive the lever hinged seat to move upward.

In an embodiment of the invention, the lever is provided with an inserted pin for being in limiting cooperation with the lever hinged seat, a first spring for providing a pressure for the inserted pin and a control mechanism for pulling the inserted pin.

In an embodiment of the invention, the control mechanism includes a pull rope for pulling the inserted pin, a pull pin for being connected to the pull rope and a second spring for limiting the pull pin and helping the pull pin to reset.

T In an embodiment of the invention, outer ends of cross rods on both sides of the front folding mechanism, the rear folding mechanism and the side folding mechanism are respectively hinged to the corresponding hinged seats.

In an embodiment of the invention, the side folding mechanism includes two X-shaped cross-hinged rod assemblies hinged by ends, with upper ends of both sides respectively hinged to two upper hinged seats on the side of the chassis, and lower ends of both sides respectively hinged to two lower hinged seats on the side of the chassis.

In an embodiment of the invention, the front folding mechanism includes one X-shaped cross-hinged rod assembly, with upper ends of two cross rods respectively hinged to two upper hinged seats in front of the chassis, lower ends of two cross rods respectively hinged to two lower hinged seats in front of the chassis, and a position where two cross rods are hinged provided with a lever holder, the lever being snapped onto the lever holder.

In an embodiment of the invention, the rear folding mechanism comprises one X-shaped cross-hinged rod assembly, with upper ends of two cross rods respectively hinged to two upper hinged seats behind the chassis, and lower ends of two cross rods respectively hinged to two lower hinged seats behind the chassis.

In an embodiment of the invention, the lower hinged seat is provided with a support rod, and when the folding cart is in a fully open state, the support rod is in inserted cooperation with the corresponding upper hinged seat.

In an embodiment of the invention, a reinforcing rod is hinged between the support rod and the adjacent X-shaped cross-hinged rod assemblies.

In an embodiment of the invention, the lower hinged seat is provided with the support rod, and the reinforcing rod is hinged between the support rod and the adjacent X-shaped cross-hinged rod assemblies.

In an embodiment of the invention, the lever is fixedly connected to the lever hinged seat.

In an embodiment of the invention, the chassis includes a chassis hinged seat and four chassis connecting rods hinged to the chassis hinged seat, and the four chassis connecting rods are respectively hinged to the corresponding lower hinged seats.

In an embodiment of the invention, the upper hinged seat is provided with an abutment portion.

The present invention is reasonable in design, has a simple structure and can be folded and stored when not in use, thus occupying small space and being convenient to use.

DESCRIPTION OF THE EMBODIMENTS

Figure 1:
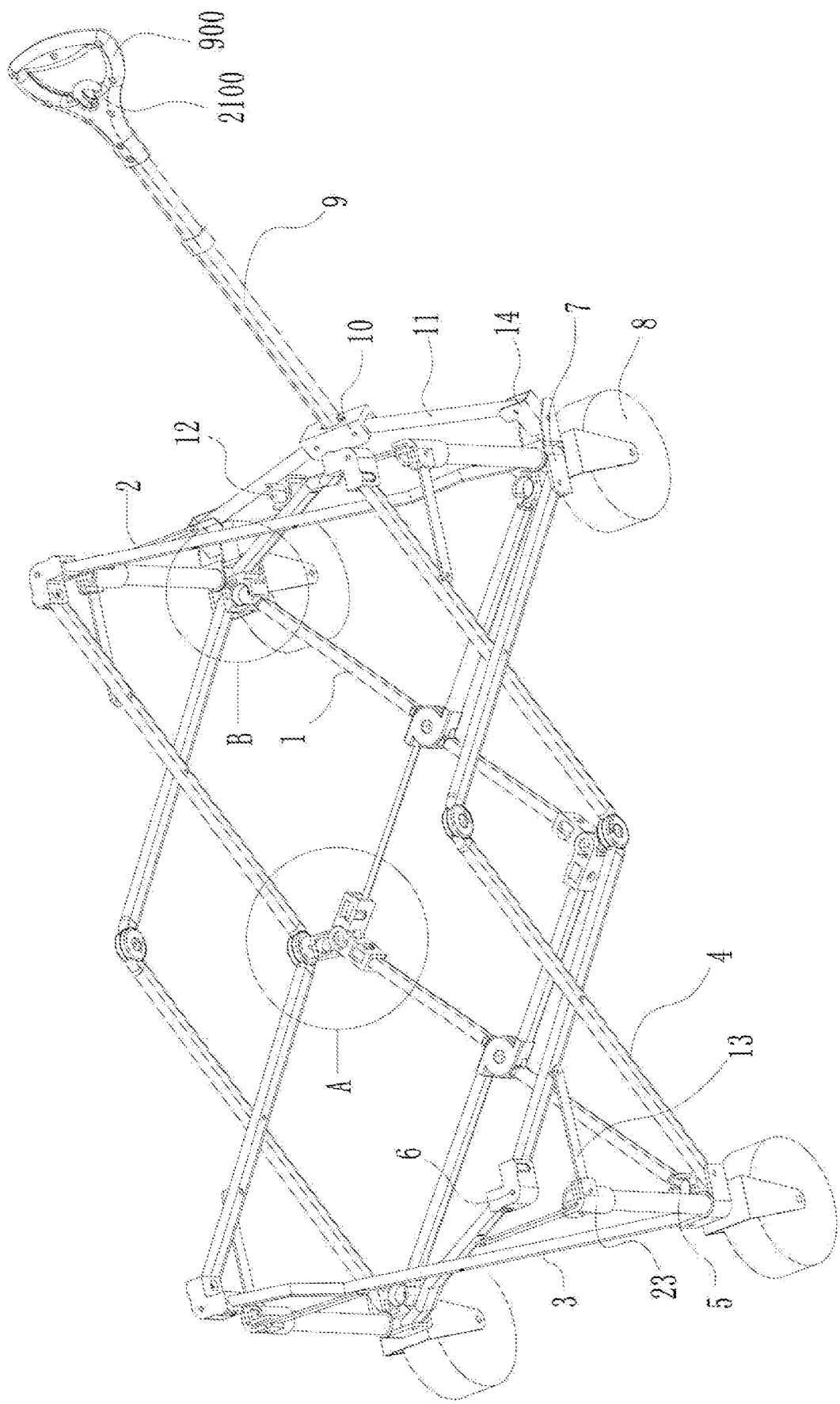
FIG. 1 is a structural schematic diagram of an embodiment 1 in a fully open state.
Figure 2:
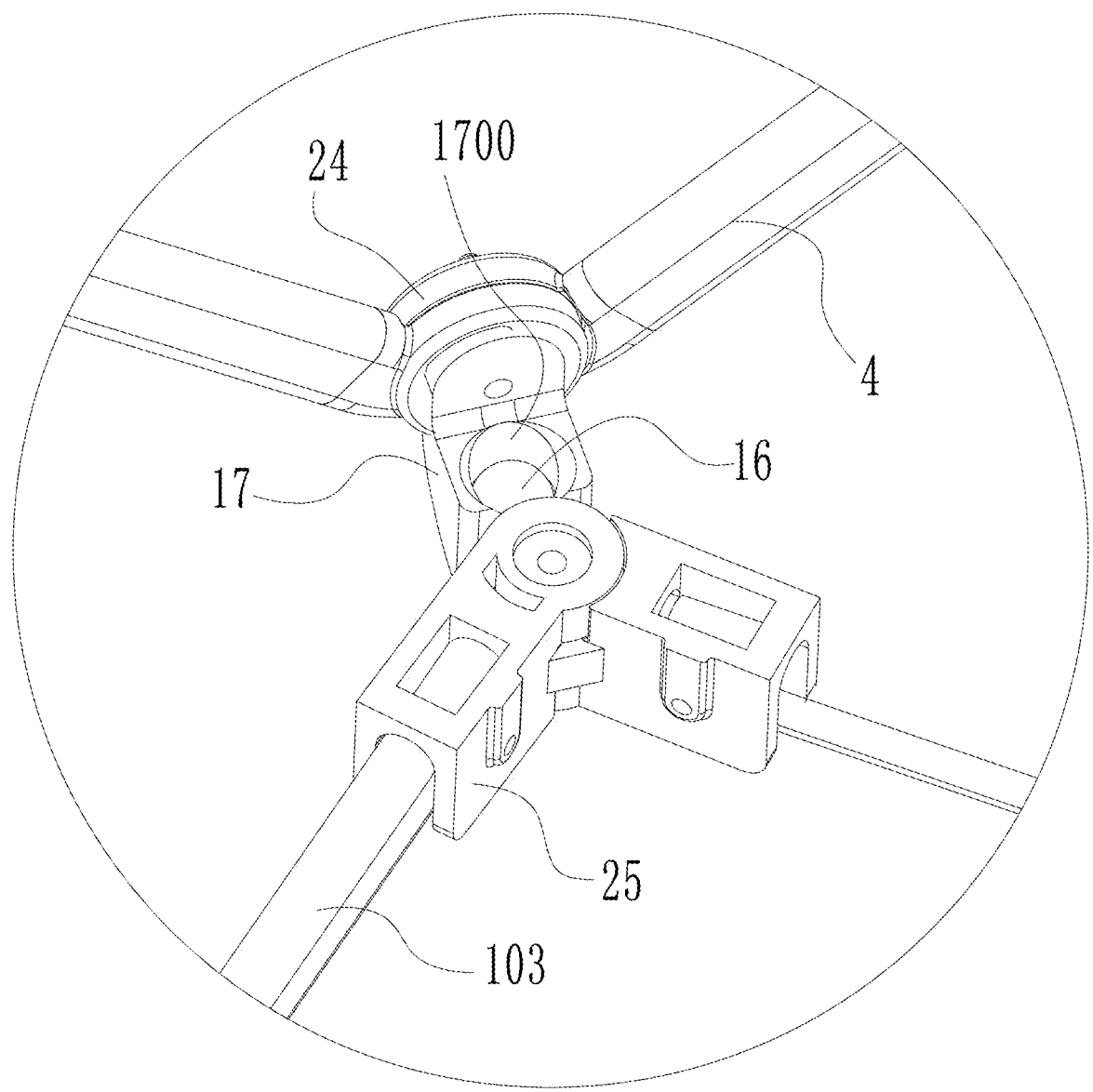
FIG. 2 is an enlarged view of a position A in FIG. 1.
Figure 3:
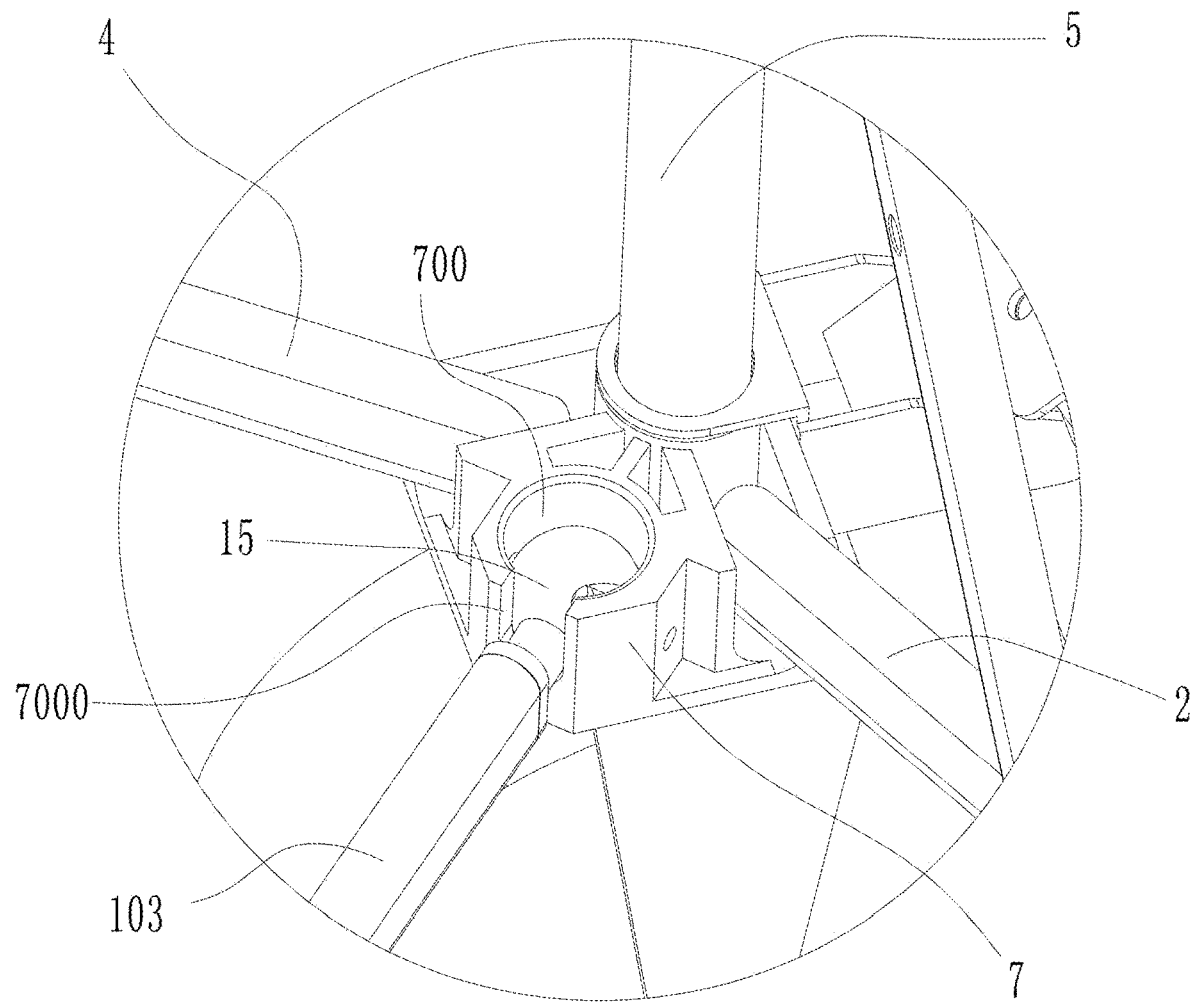
FIG. 3 is an enlarged view of a position B in FIG. 1.
Figure 4:
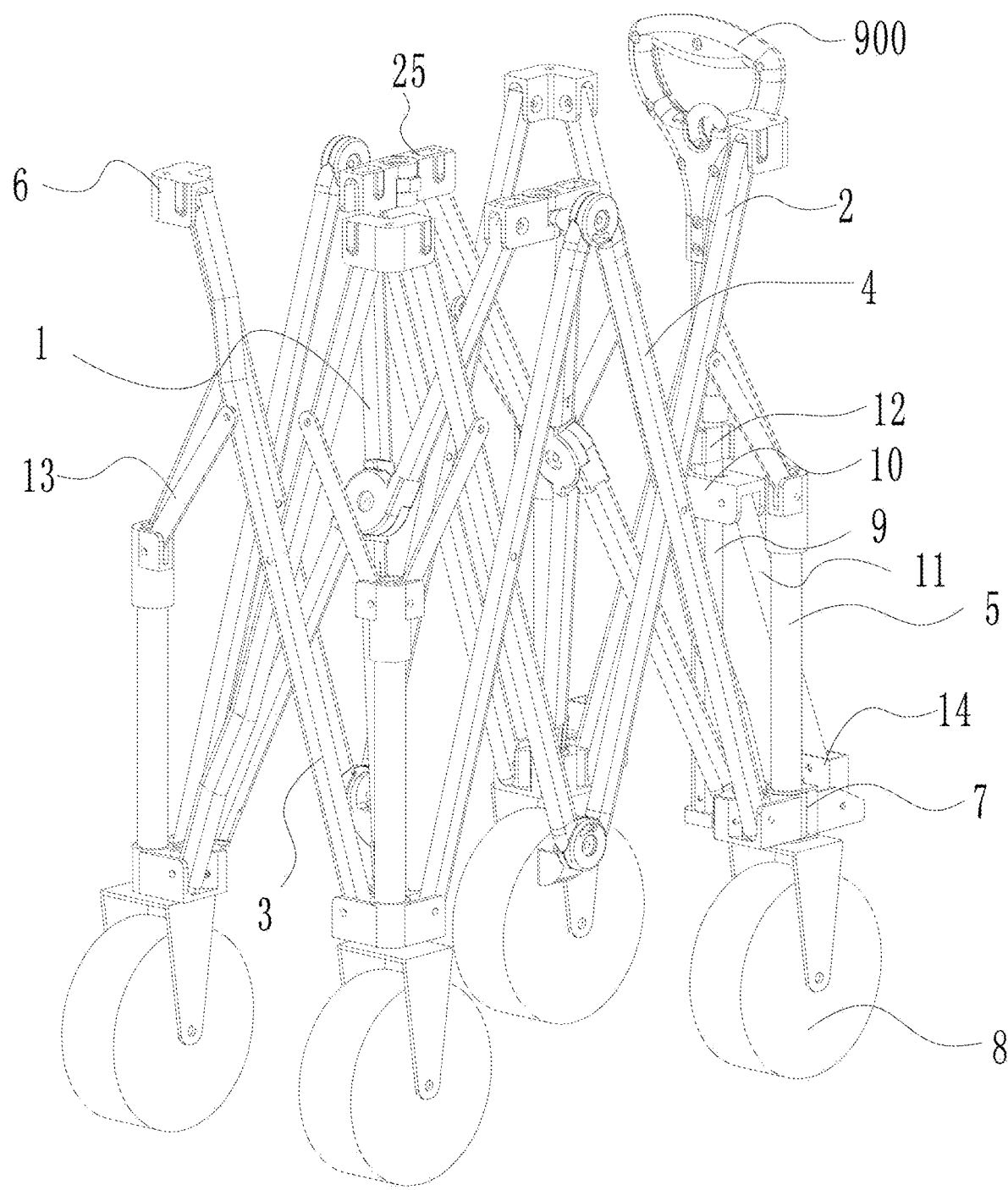
FIG. 4 is a structural schematic diagram of an embodiment 1 in a half-open state.
Figure 5:
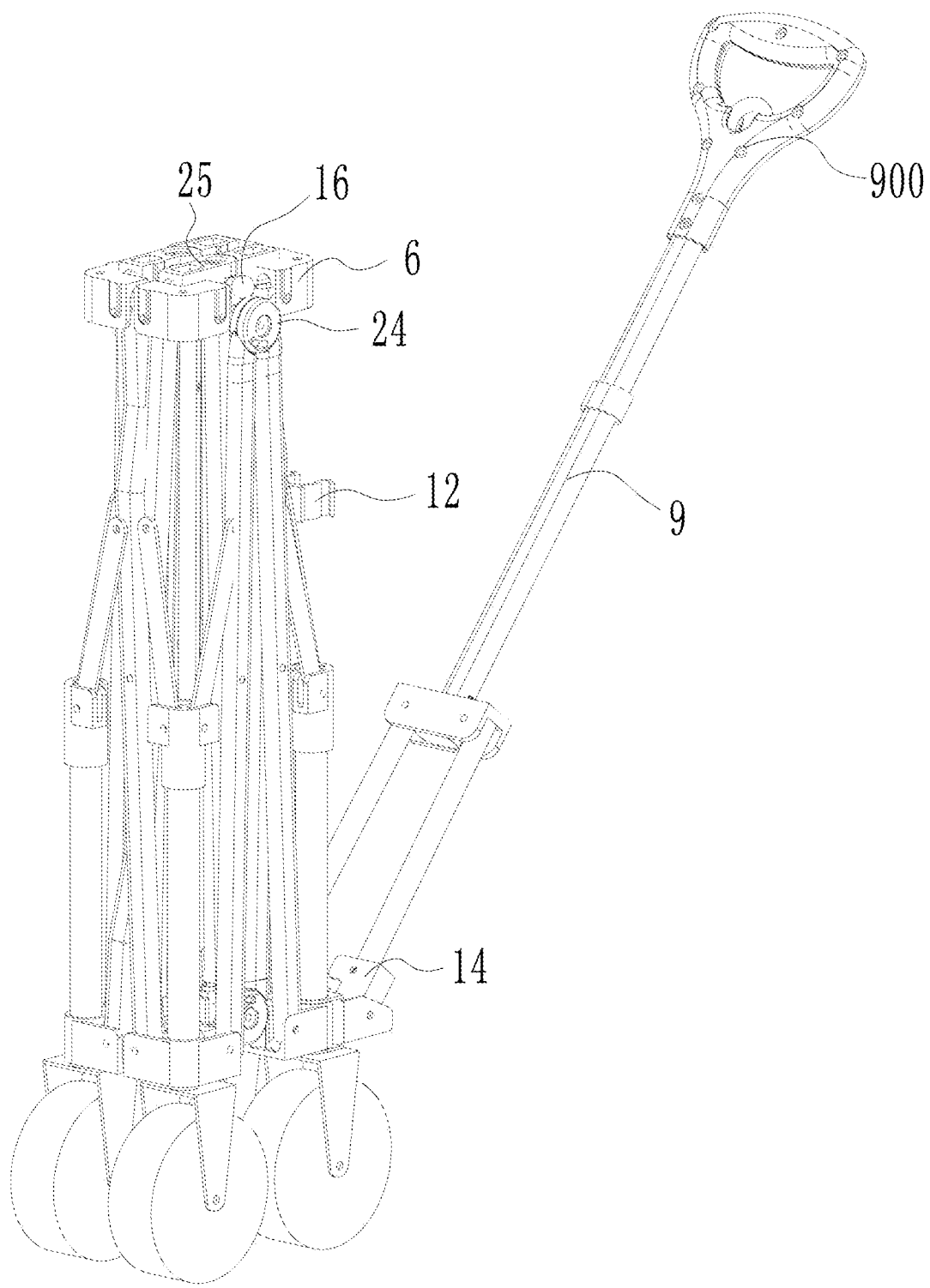
FIG. 5 is a first structural schematic diagram of an embodiment 1 in a retracted state.
Figure 6:
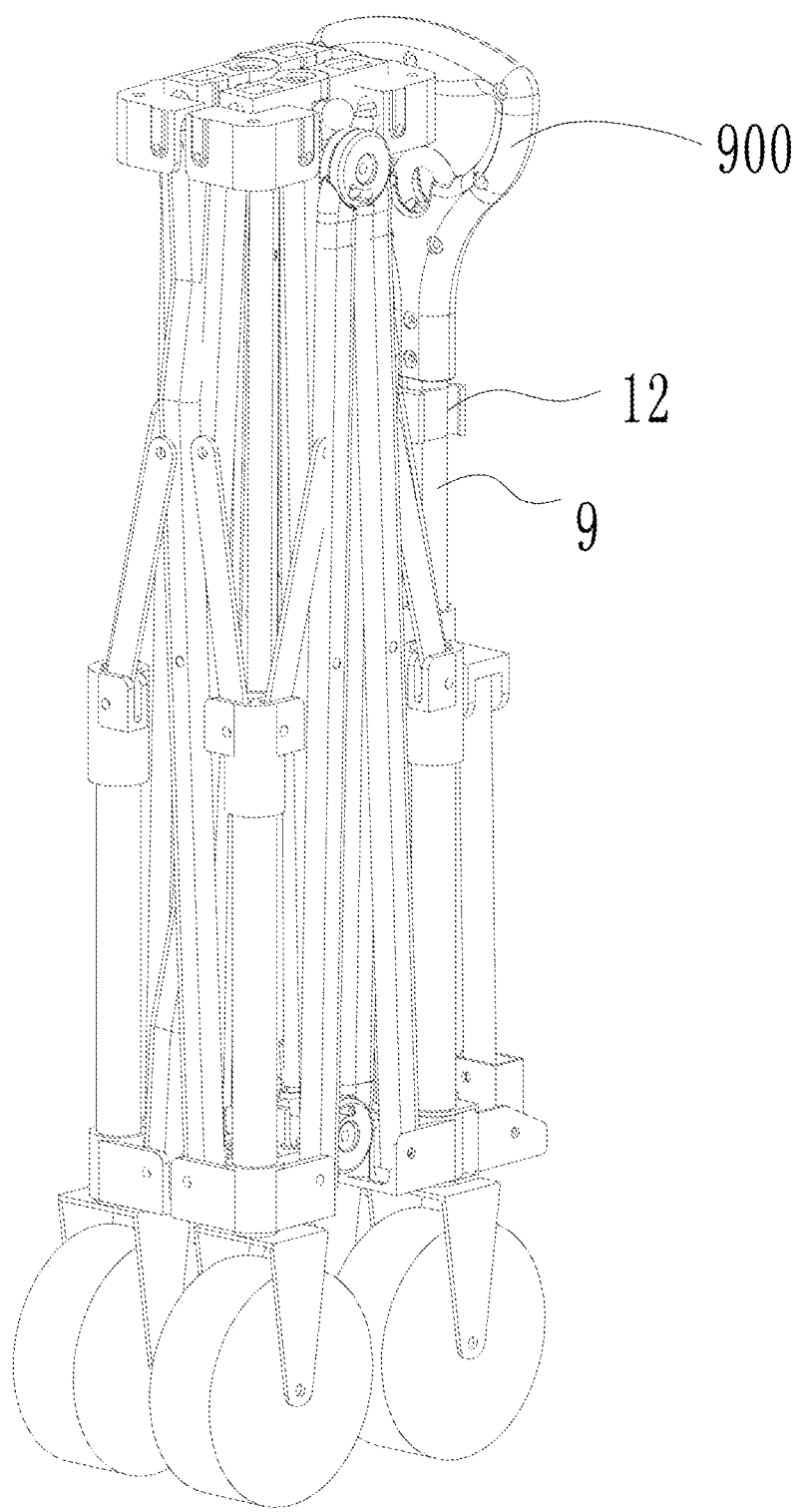
FIG. 6 is a second structural schematic diagram of an embodiment 1 in a retracted state.
Figure 7:
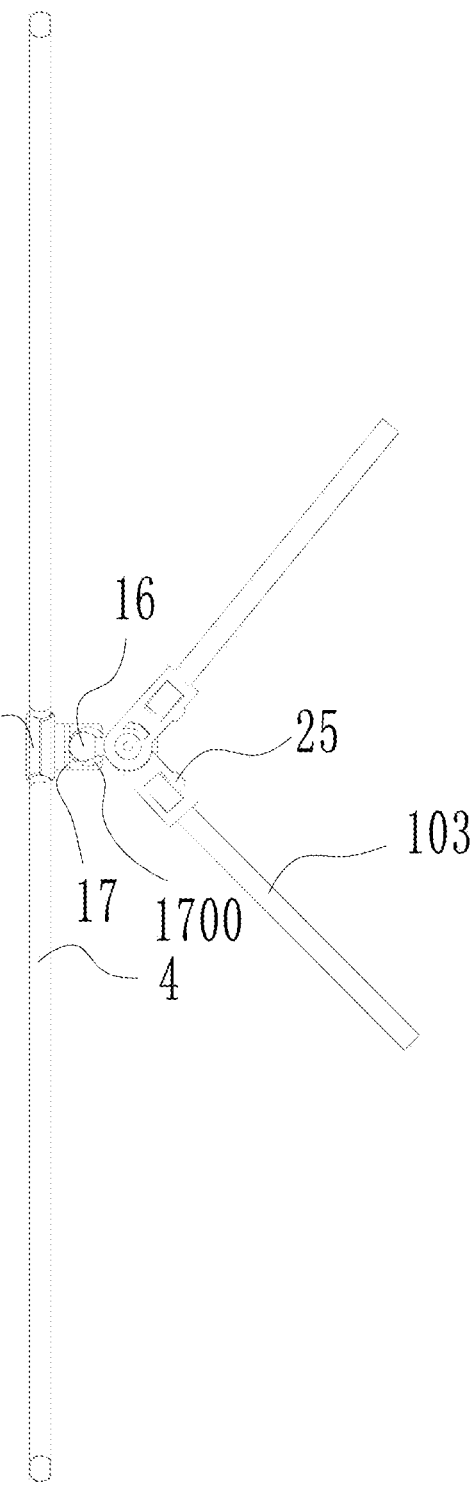
FIG. 7 is a schematic diagram of a connecting structure of a side folding mechanism and a bottom rod in an embodiment 1.
Figure 8:
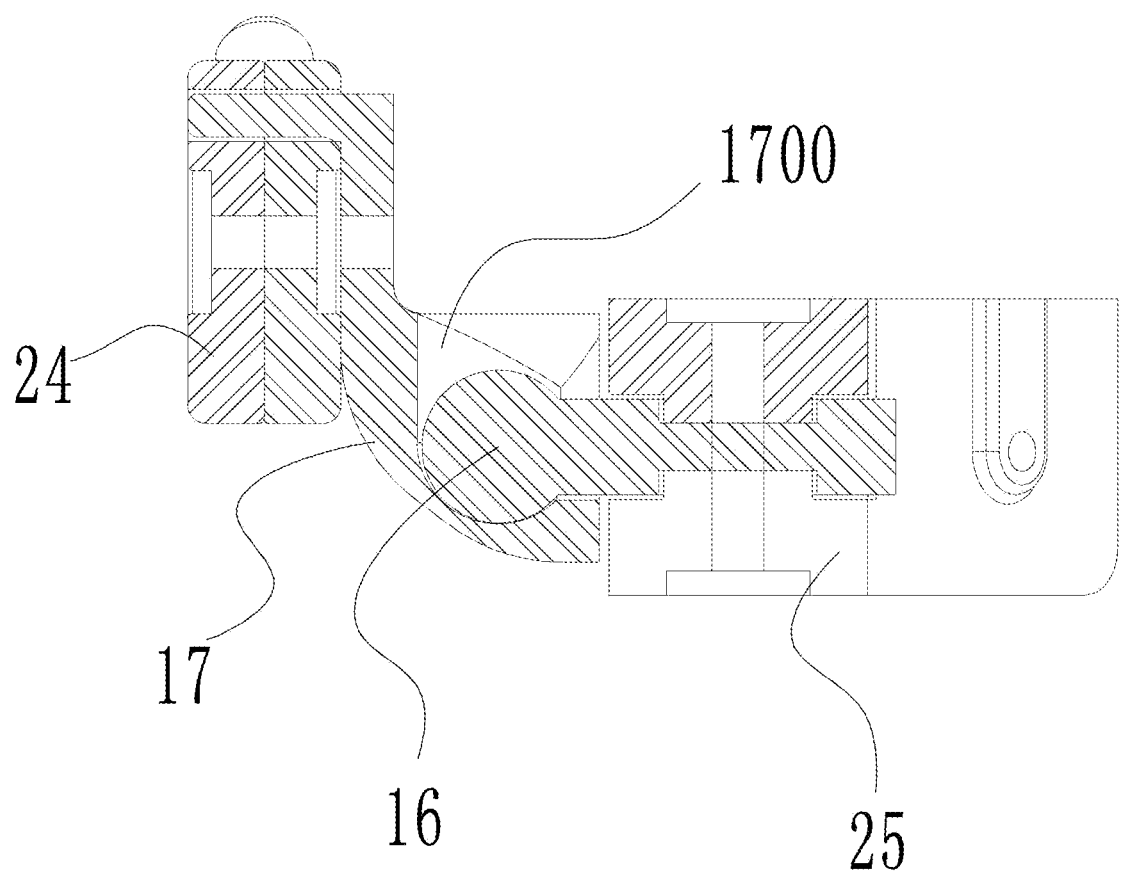
FIG. 8 is a sectional view of a connecting structure of a first connecting piece and a second connecting piece in an embodiment 1.
Figure 9:
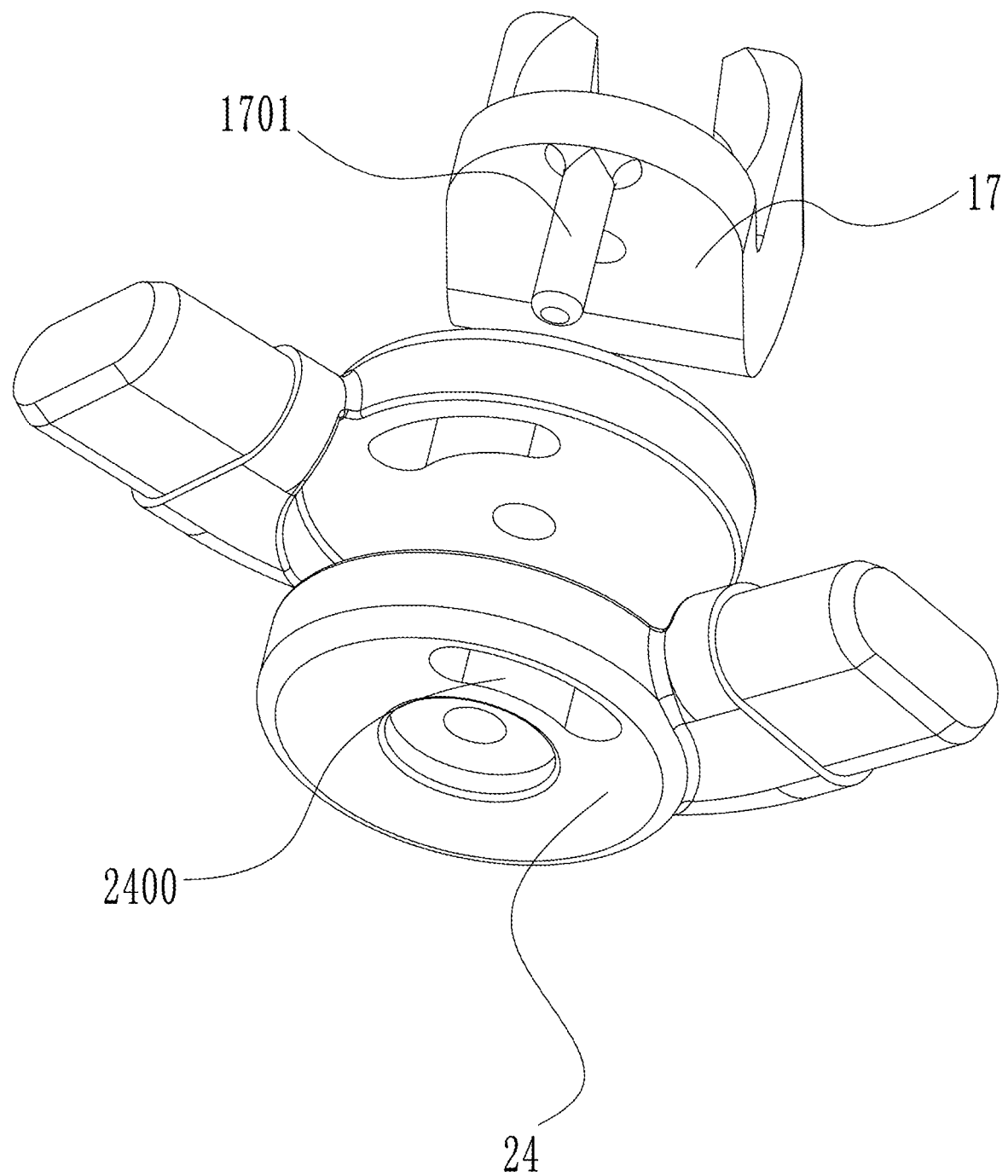
FIG. 9 is a schematic diagram of a connecting structure of a side folding mechanism and a second connecting piece in an embodiment 1.
Figure 10:
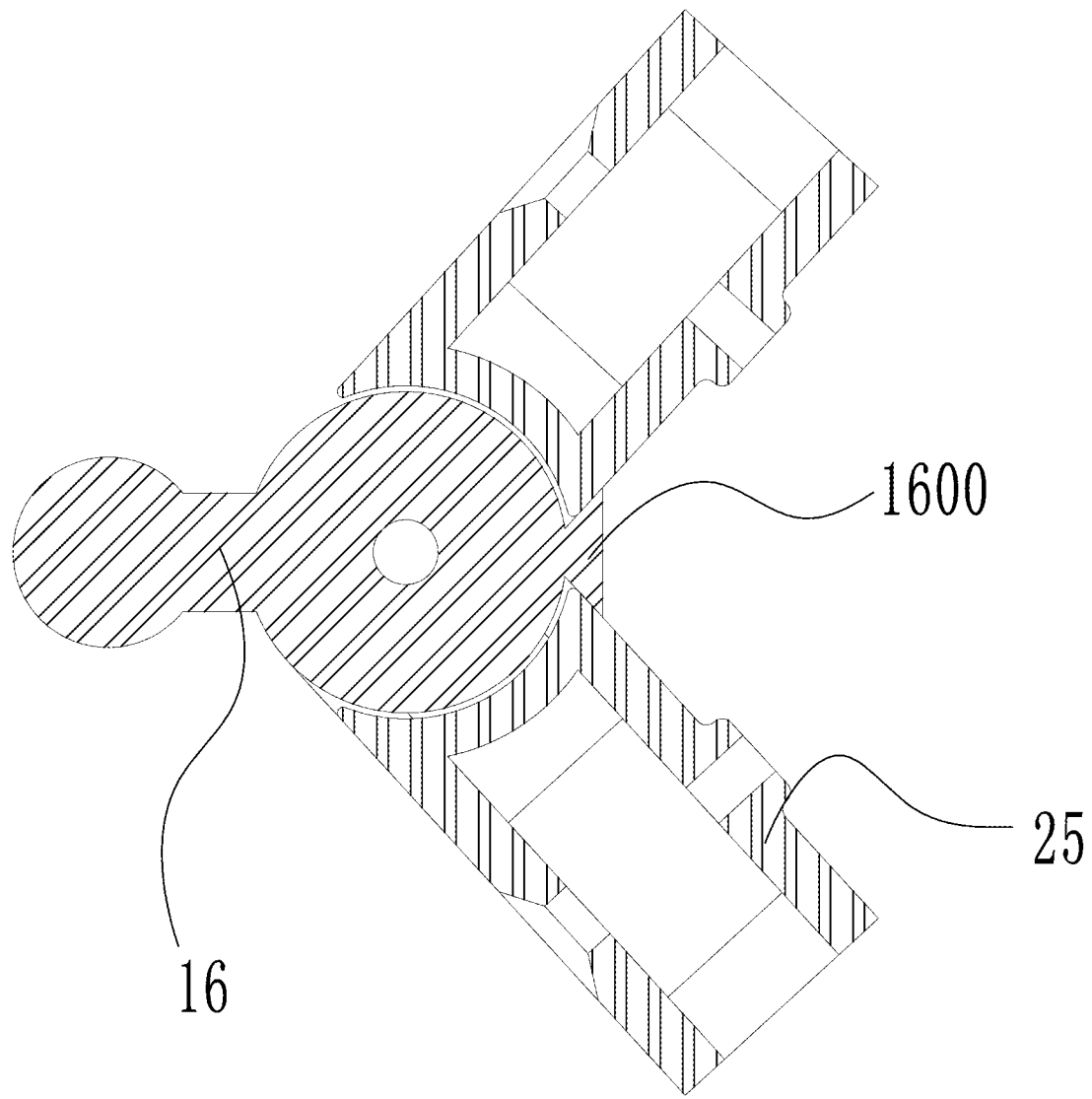
FIG. 10 is a sectional view of a connecting structure of a first connecting piece and a bottom rod in an embodiment 1.
Figure 11:
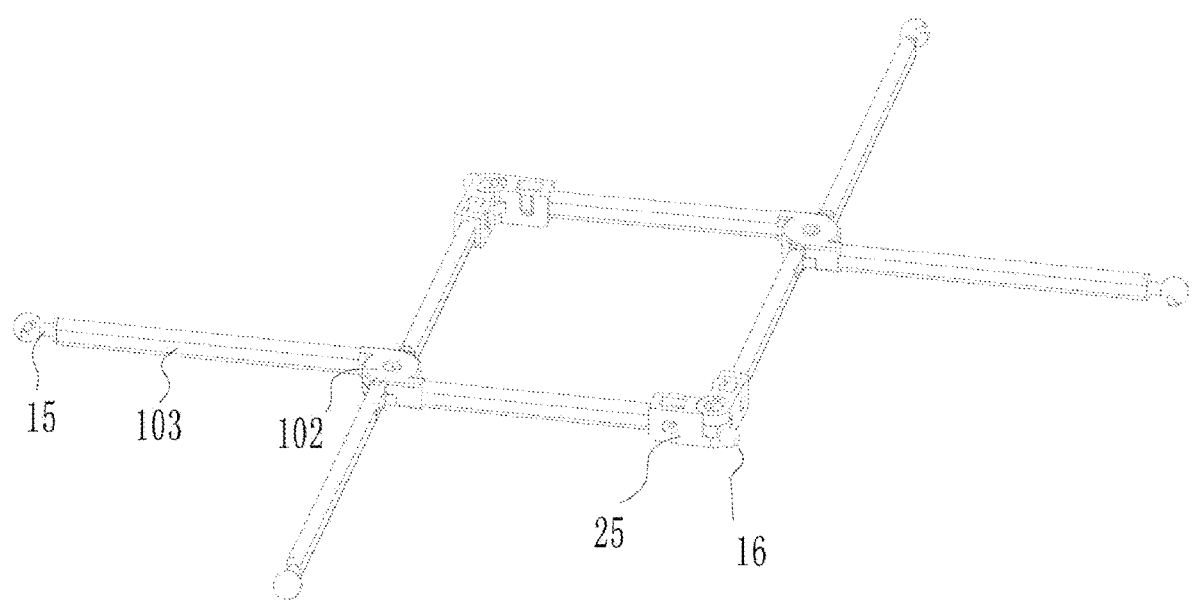
FIG. 11 is a first structural schematic diagram of a chassis in an embodiment 1.
Figure 12:
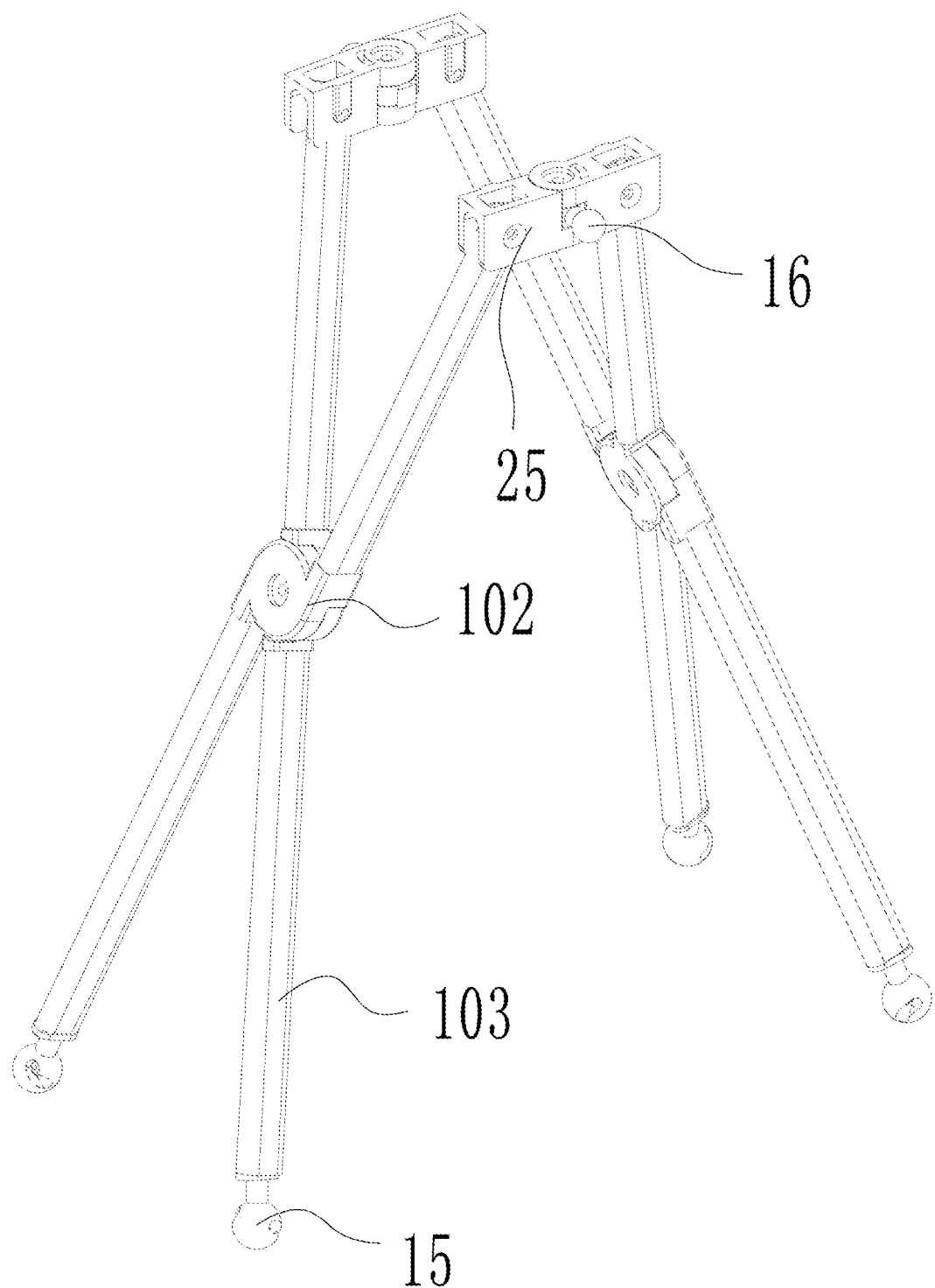
FIG. 12 is a second structural schematic diagram of a chassis in an embodiment 1.
Figure 13:
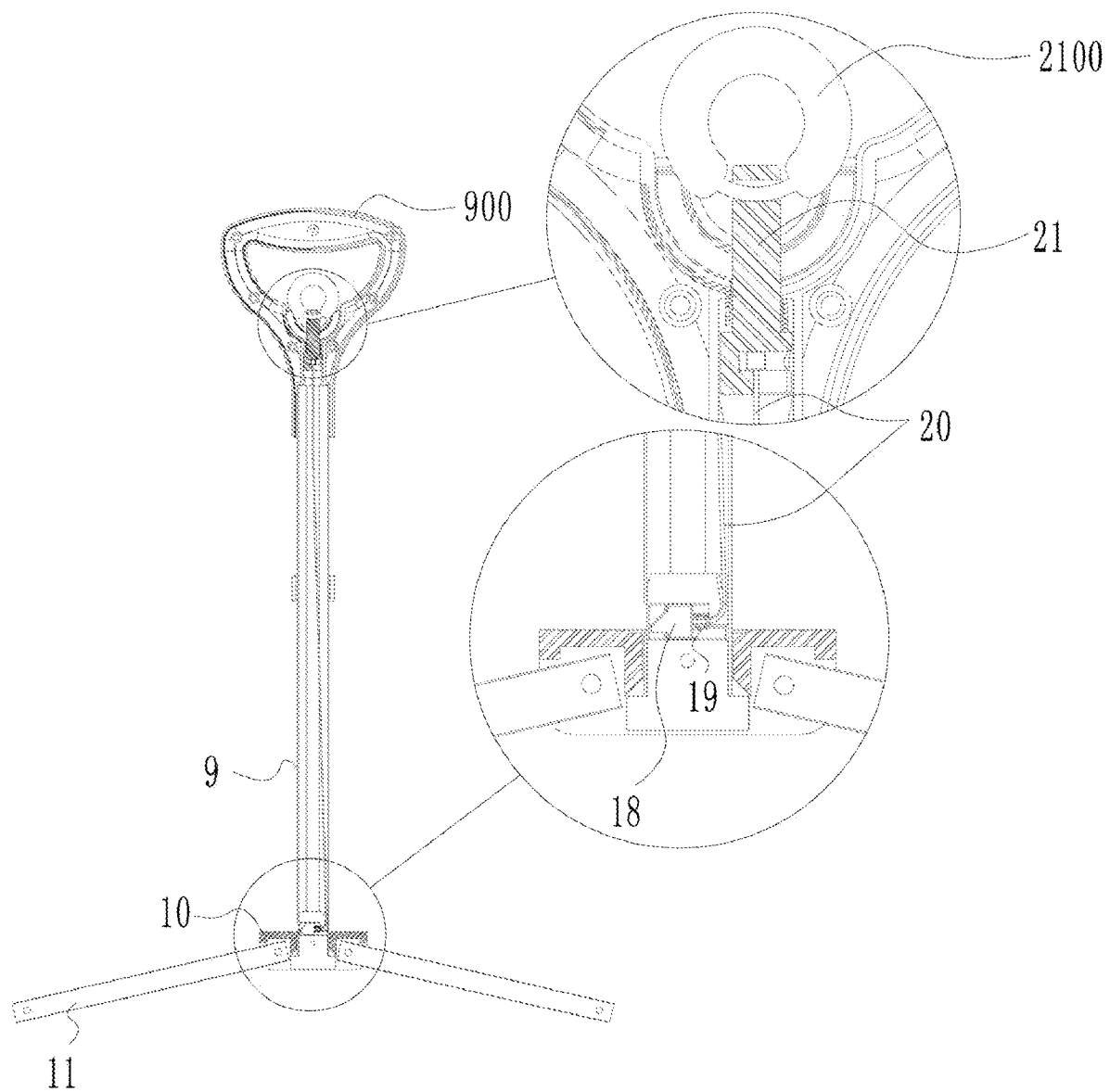
FIG. 13 is a schematic diagram of an internal structural of a handle mechanism in an embodiment 1.
Figure 14:
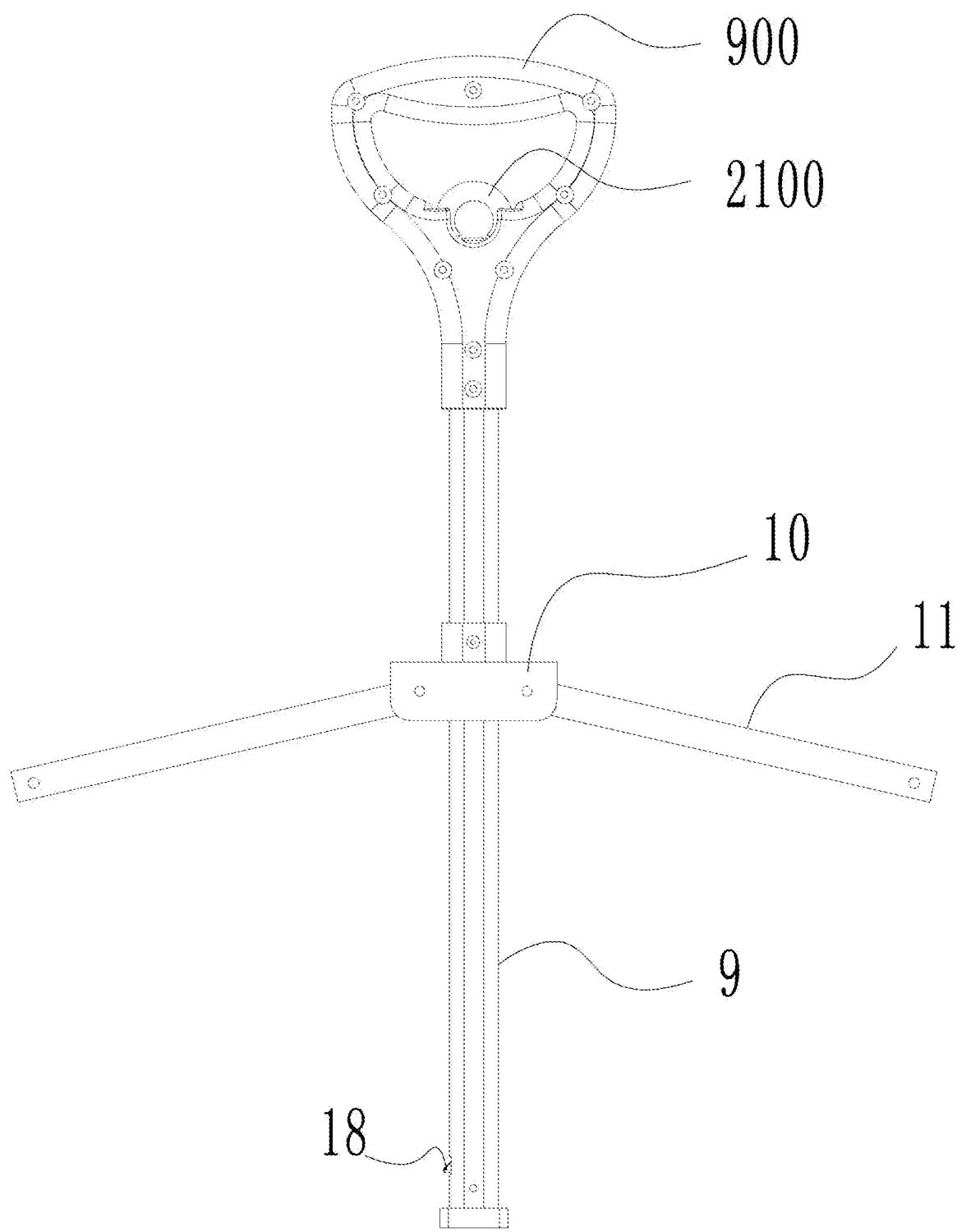
FIG. 14 is a schematic diagram of an external structural of a handle mechanism in an embodiment 1.
Figure 15:
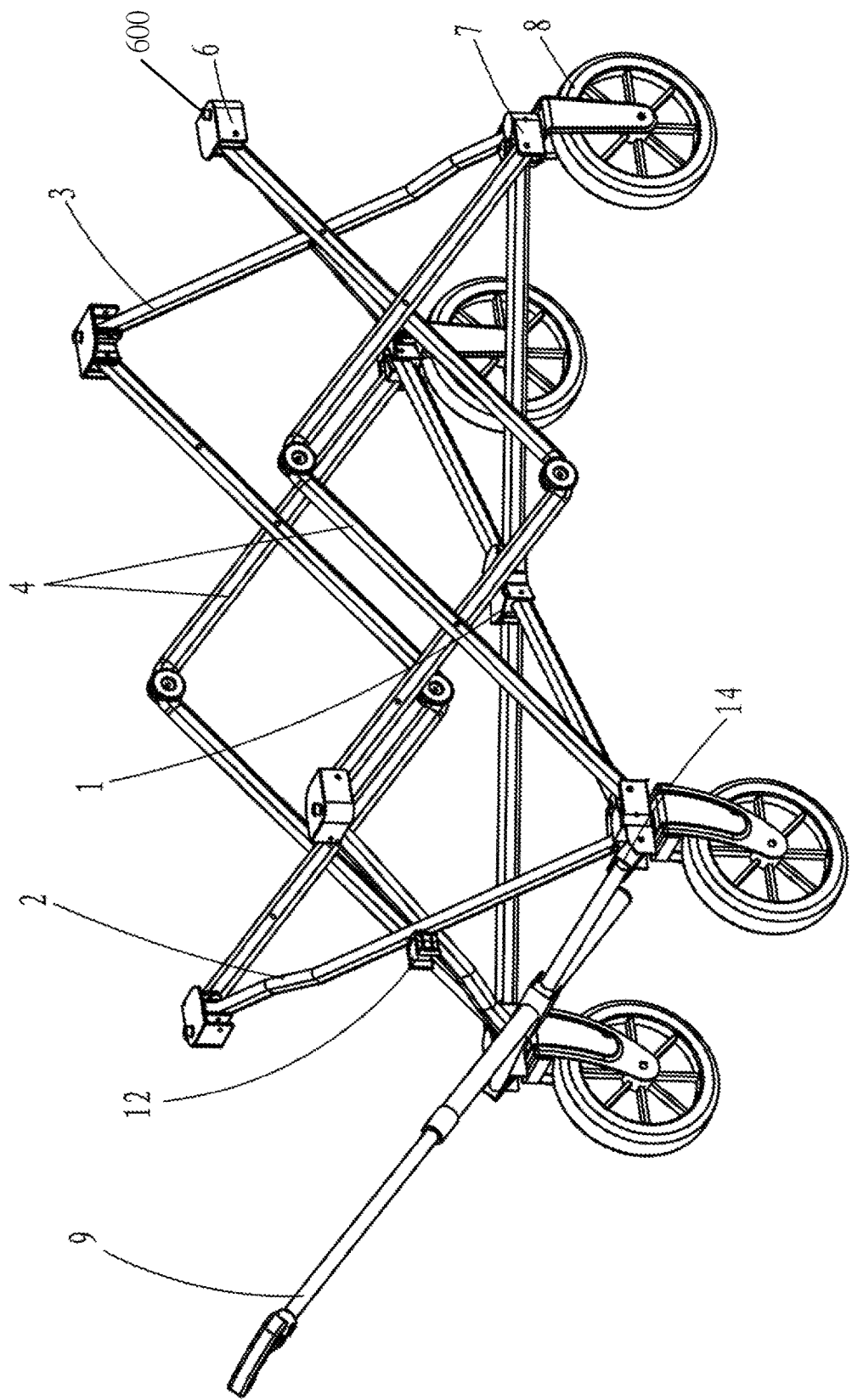
FIG. 15 is a structural schematic diagram of an embodiment 2.
Figure 16:
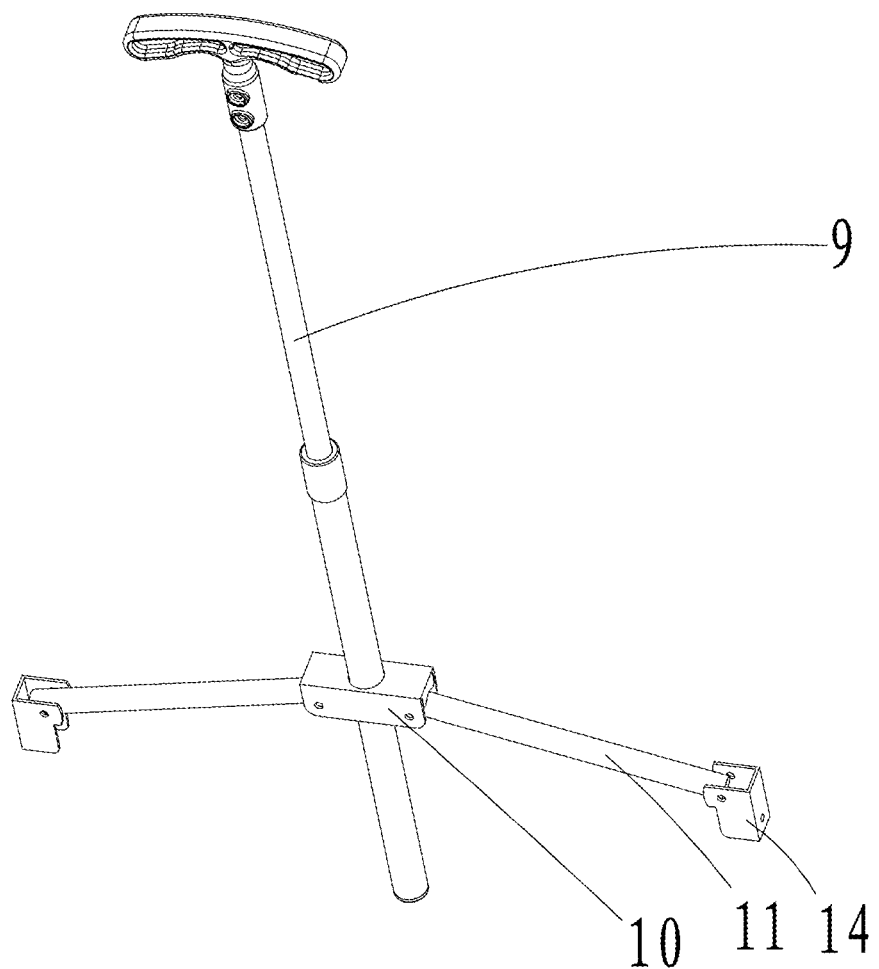
FIG. 16 is a structural schematic diagram of a handle mechanism in an embodiment 2.
Figure 17:
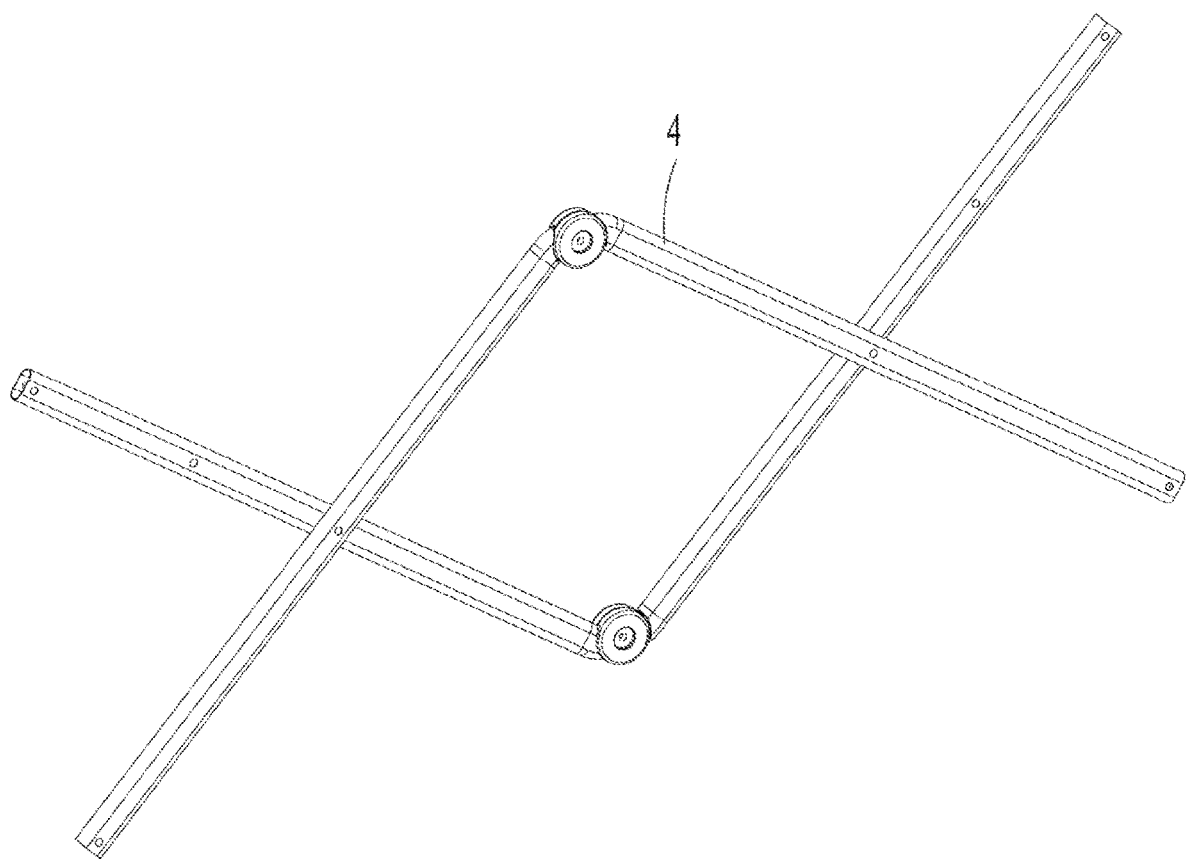
FIG. 17 is a structural schematic diagram of a side folding mechanism in an embodiment 2.
Figure 18:
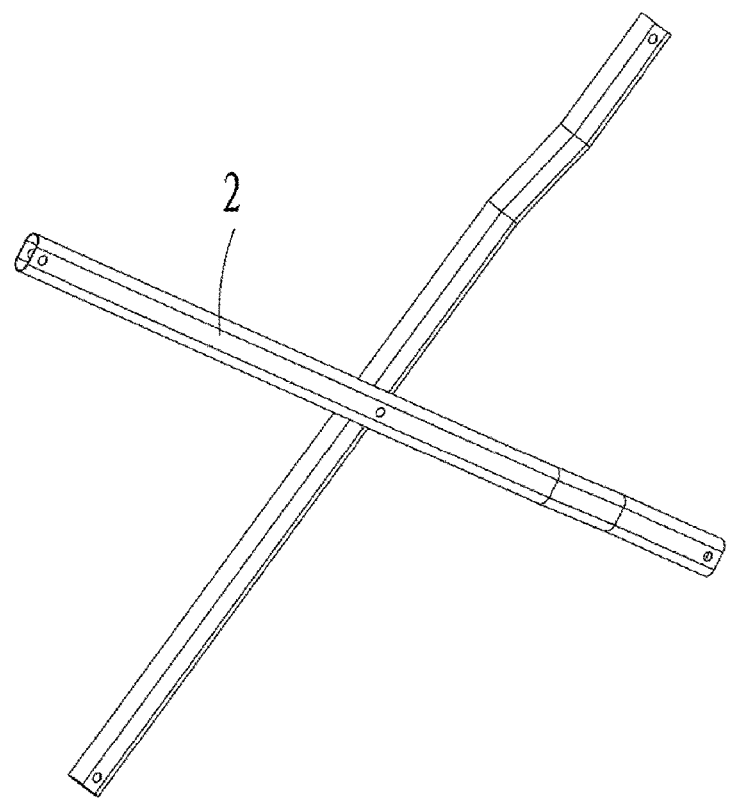
FIG. 18 is a structural schematic diagram of a front folding mechanism in an embodiment 2.
Figure 19:
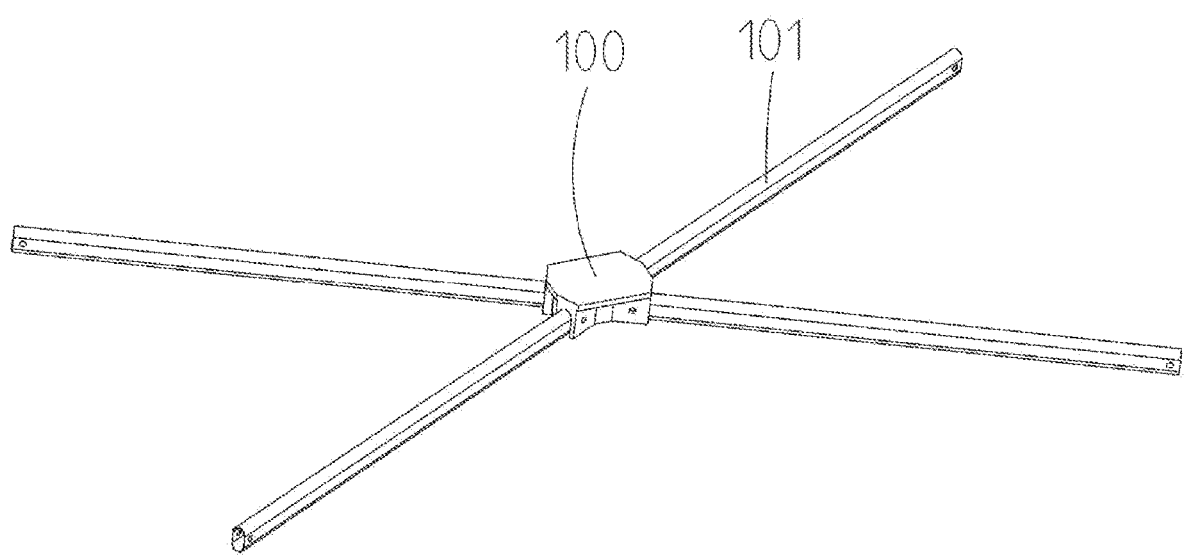
FIG. 19 is a structural schematic diagram of a chassis in an embodiment 2.

In the description of the present invention, it should be understood that orientations or position relationships indicated by terms "one end", "the other end", "outer end", "outer side", "upper", "inner side", "horizontal", "coaxial", "center", "end", etc. are orientation or position relationships as shown in the drawings, and these terms are just used to facilitate description of the present invention and simplify the description, but not to indicate or imply that the mentioned device or elements must have a specific orientation and must be established and operated in a specific orientation, and thus, these terms cannot be understood as a limitation to the present invention.

The present invention will be further elaborated hereafter with reference to the drawings.

Embodiment 1

As shown in FIG. 1 to FIG. 14, a folding cart includes a frame body and a handle mechanism. The frame body includes a chassis 1, lower hinged seats 7 respectively at four corners of the chassis 1, a front folding mechanism 2 in front of the chassis 1, a rear folding mechanism 3 behind the chassis 1, and two side folding mechanisms 4 on the side of the chassis 1.

A bottom portion of each of the lower hinge seats 7 is provided with wheels 8, a plurality of hinge sheets are arranged on the upper hinge seats 6 and the lower hinge seats 7, a rod piece may be hinged between two connecting sheets, an upper end surface of the upper hinge seat 6 is provided with an abutment portion 600, and the abutment portion 600 has a T-shaped longitudinal section, which can catch objects such as cloth, rope and the like.

The chassis 1 is of an X-shaped cross-hinged structure, and four ends of the chassis 1 are respectively hinged to the four lower hinged seats 7.

Each of the side folding mechanisms 4 includes two X-shaped cross-hinged rod assemblies, each of which includes two hinged cross rods, upper ends of both sides of the side folding mechanism 4 are respectively hinged to upper hinged seats 6, and lower ends of both sides of the side folding mechanism 4 are respectively hinged to the corresponding lower hinged seats 7.

The front folding mechanism 2 includes one X-shaped cross-hinged rod assembly, with upper ends of two cross rods respectively hinged to two upper hinged seats 6 in front of the chassis 1, and lower ends of two cross rods respectively hinged to two lower hinged seats 7 in front of the chassis 1. A position where two cross rods are hinged provided with a lever holder 12, the lever 9 being snapped onto the lever holder 12. The lever holder 12 is a plastic piece having a bayonet that fits the shape of the lever 9.

Similarly, the rear folding mechanism 3 includes one X-shaped cross-hinged rod assembly including two hinged cross rods. Upper ends of two cross rods respectively hinged to two upper hinged seats 6 behind the chassis 1, and lower ends of two cross rods respectively hinged to two lower hinged seats 7 behind the chassis 1. The rear folding mechanism 3 substantially has the same structure as the front folding mechanism 2.

The handle mechanism includes a lever 9, a lever hinged seat 10 disposed on the lever 9, and pulling rods 11 respectively hinged to both sides of the lever hinged seat 10. The two pulling rods 11 are respectively hinged to the two lower hinged seats 7 in front of the chassis 1, and the lever 9 can drive the lever hinged seat 10 to move upward. Specifically, the lever 9 may be of a telescopic structure, lower ends of the pulling rods 11 are hinged to pulling rod hinged seats 14, and the pulling rod hinged seats 14 are hinged to the corresponding lower hinged seats 7.

When in use, the lever 9 is removed from the lever holder 12, and then the lever 9 is pulled up, the lever 9 drives the lever hinged seat 10 to move upward and the lever hinged seat 10 drives two lower hinged seats 9 connected therewith to move away from each other, so that the entire fame body is fully opened and one layer of cloth for the load is put on the cart as needed.

In the above structure, the chassis 1 includes two X-shaped cross-hinge structures. Each X-shaped cross-hinge structure includes two hinged bottom rod assemblies. An outer end of each bottom rod assembly is universally hinged to the corresponding lower hinged seat 7. An inner end of the bottom rod assembly and an inner end of the corresponding bottom rod assembly in the other X-shaped cross-hinge structure are jointly hinged to a first connecting piece 16. Lower ends of the adjacent sides of two X-shaped cross-hinge rod assemblies in the side folding mechanism 4 are jointly hinged to a second connecting piece 17. When the folding cart is switched from an open state to a contracted state, the X-shaped cross-hinged structures can tilt and swing relative to the lower hinged seats 7, so that the two X-shaped cross-hinged structures are switched from the original horizontal state to a folded state, and the first connecting piece 16 and the second connecting piece 17 are switched from the original buckled state to a separated state.

Preferably, the first connecting piece 16 is of a first spherical hinge structure, and the second connecting piece 17 has a first accommodating groove 1700 for being buckled with a ball head of the first spherical hinge structure. In addition, the structure may be changed as follows. The second connecting piece 17 is arranged as a first spherical hinge structure, and the first connecting piece 16 has a first accommodating groove 1700. The first spherical hinge structure may be designed into square, cylinder and other shapes, but is not limited to a spherical shape, and a shape of the first accommodating groove 1700 corresponds to that of the first spherical hinge structure.

Preferably, the bottom rod assembly includes a chassis connecting base 102 and bottom rods 103 fixedly mounted on both sides of the chassis connecting base 102, two chassis connecting bases 102 in each X-shaped cross-hinge structure are hinged, and four rods 103 form an X shape and are staggered.

In the above structure, an outer end of the bottom rod 103 is provided with a second spherical hinge structure 15, the lower hinged seat 7 is provided with a second accommodating groove 700 for being universally hinged to a ball head of the second spherical hinge structure 15, and the second accommodating groove 700 has an opening 7000 for the second spherical hinge structure 15 to tilt and swing along with the bottom rod 103. In addition, the structure may be changed as follows: the lower hinged seat 7 is provided with a second spherical hinge structure 15, and an outer end of the bottom rod 103 is provided with a second accommodating groove 700.

The bottom rod assembly is further described as follows: in the bottom rod assembly, one bottom rod 103 is close to the outside and is cooperatively connected to the lower hinged seat 7 through the second spherical hinge structure 15. The other bottom rod 103 is close to a middle part of the cart, and bottom rod hinge piece 25 is fixedly mounted at one end, away from the chassis connecting base 102, of the other bottom rod 103. The two corresponding bottom rods 103 are jointly hinged to the first connecting piece 16 through the bottom rod hinge piece 25 and a pin shaft. One end, facing away from the ball head, of the first connecting piece 16 is provided with a limiting block 1600, and the limiting block 1600 is of a trapezoidal structure. When two bottom rod hinge pieces 25 rotate to a minimum angle, the two bottom rod hinge pieces 25 are in stop connection to the limiting block 1600, so that the first connecting piece 16 maintains stable, does not rotate and facilitate cooperation.

The side folding mechanism 4 is further described as follows. Two corresponding cross rods in the side folding mechanism 4 are jointly hinged to the second connecting piece 17 through respective side folding mechanism hinged seats 24 and a hinge shaft. The second connecting piece 17 has a rotating pin 1701. The two side folding mechanism hinged seats 24 have arc-shaped grooves 2400 and the two arc-shaped grooves 2400 are bilaterally symmetrical. The rotating pin 1701 is inserted into the two arc-shaped grooves 2400 at the same time. When the two side folding mechanism hinged seats 24 rotate left and right to a maximum angle, the rotating pin 1701 is just confined in the middle, so that the second connecting piece 17 maintains stable, does not rotate and facilitates cooperation.

In the embodiment, a reinforcing rod mounting base 23 is fixedly mounted at an upper end of the support rod 5, and the support rod 5 is hinged to a reinforcing rod 13 through the reinforcing rod mounting base 23.

In the above structure, the lever 9 in the handle mechanism of the embodiment is provided with an inserted pin 18 for being in limiting cooperation with the lever hinged seat 10, a first spring 19 for providing a pressure for the inserted pin 18 and a control mechanism for pulling the inserted pin 18.

Preferably, the control mechanism includes a pull rope 20 for pulling the inserted pin 18, a pull pin 21 for being connected to the pull rope 20 and a second spring 22 for limiting the pull pin 21 and helping the pull pin 21 to reset.

Further, an upper end of the lever 9 is provided with an annular handle 900, the pull pin 21 is inserted at the upper end of the lever 9 and has a pull ring 2100, and the pull ring 2100 is located in the annular handle 900.

When the embodiment is retracted, the front folding mechanism 2, the rear folding mechanism 3, the side folding mechanism 4 and the chassis 1 are retracted, wherein the two X-shaped cross-hinge structures of the chassis 1 are gradually turned and are finally folded in half. The bottom rod hinge piece 25 drives the first connecting piece 16 to move upwards and be separated from the second connecting piece 17. The bottom rod hinge piece 25 and the upper hinged seat 6 are finally integrated into a block, so that the volume of the cart is greatly shrunk. The pull pin 21 is pulled, the pull pin 21 drives the inserted pin 18 by the pull rope 20 to be separated from the opening of the lever 9, and the inserted pin 18 is not in stop connection to the lever hinged seat 10 anymore, so that the lever 9 can be pressed down, the handle mechanism is entirely shortened and the lever 9 is finally clamped on the lever holder 12.

Embodiment 2

As shown in FIG. 15 to FIG. 19, a folding cart includes a frame body and a handle mechanism, wherein the frame body includes a chassis 1, lower hinged seats 7 at four corners of the chassis 1, a front folding mechanism 2 in front of the chassis 1, a rear folding mechanism 3 behind the chassis 1 and two side folding mechanisms 4 on the side of the chassis 1.

A bottom portion of each of the lower hinge seats 7 is provided with wheels 8, a plurality of hinge sheets are arranged on the upper hinge seats 6 and the lower hinge seats 7, a rod piece may be hinged between two connecting sheets, an upper end surface of the upper hinge seat 6 is provided with an abutment portion 600, and the abutment portion 600 has a T-shaped longitudinal section, which can catch objects such as cloth, rope and the like.

The chassis 1 is an X-shaped cross-hinged structure, and four ends of the chassis 1 are respectively hinged to the four lower hinge seats 7. Specifically, the chassis 1 includes a chassis hinge seat 100 located centrally and four chassis links 101 hinged to the chassis hinge seat 100. The four chassis links 101 are respectively hinged to the corresponding lower hinge seats 7. The chassis hinge seat 100 is also surrounded with a plurality of hinge sheets, and a rod piece may be hinged between two connecting pieces.

The side folding mechanism 4 includes two sets of X-shaped cross-hinged rods including two hinged cross rods, upper ends of both sides of the side folding mechanism 4 are respectively hinged to upper hinged seats 6, and lower ends of both sides of the side folding mechanism 4 are respectively hinged to the corresponding lower hinged seats 7.

The front folding mechanism 2 includes one X-shaped cross-hinged rod assembly, with upper ends of two cross rods respectively hinged to two upper hinged seats 6 in front of the chassis 1, and lower ends of two cross rods respectively hinged to two lower hinged seats 7 in front of the chassis 1. A position where two cross rods are hinged provided with a lever holder 12. The lever 9 is snapped onto the lever holder 12, and the lever holder 12 is a plastic piece having a bayonet that fits the shape of the lever 9.

Similarly, the rear folding mechanism 3 includes one X-shaped cross-hinged rod assembly including two hinged cross rods, with upper ends of two cross rods respectively hinged to two upper hinged seats 6 behind the chassis 1, and lower ends of two cross rods respectively hinged to two lower hinged seats 7 behind the chassis 1. The rear folding mechanism 3 substantially has the same structure as the front folding mechanism 2.

The handle mechanism includes a lever 9, a lever hinged seat 10 disposed on the lever 9, and pulling rods 11 hinged to both sides of the lever hinged seat 10. The two pulling rods 11 are respectively hinged to the two lower hinged seats 7 in front of the chassis 1, and the lever 9 can drive the lever hinged seat 10 to move upward. Specifically, the lever 9 may be of a telescopic structure, lower ends of the pulling rods 11 are hinged to pulling rod hinged seats 14, and the pulling rod hinged seats 14 are hinged to the corresponding lower hinged seats 7.

As a first optimized structure for the lever and the lever hinged seat, the lever 9 is fixedly connected to the lever hinged seat 10.

As a second optimized structure for the lever and the lever hinged seat, the lever 9 is slidably inserted into the lever hinged seat 10, and a lower end of the lever 9 is provided with a lever stopper, so that when the lever 9 is pulled upward, the lever stopper can drive the lever hinged seat 10 to move upward.

When in use, the lever 9 is removed from the lever holder 12, and then the lever 9 is pulled up, the lever 9 drives the lever hinged seat 10 to move upward and the lever hinged seat 10 drives two lower hinged seats 9 connected therewith to move away from each other, so that the entire fame body is fully opened and one layer of cloth for the load is put on the cart as needed.

The embodiment has advantages of saving material and having low production cost.

Embodiment 3

Figure 20:
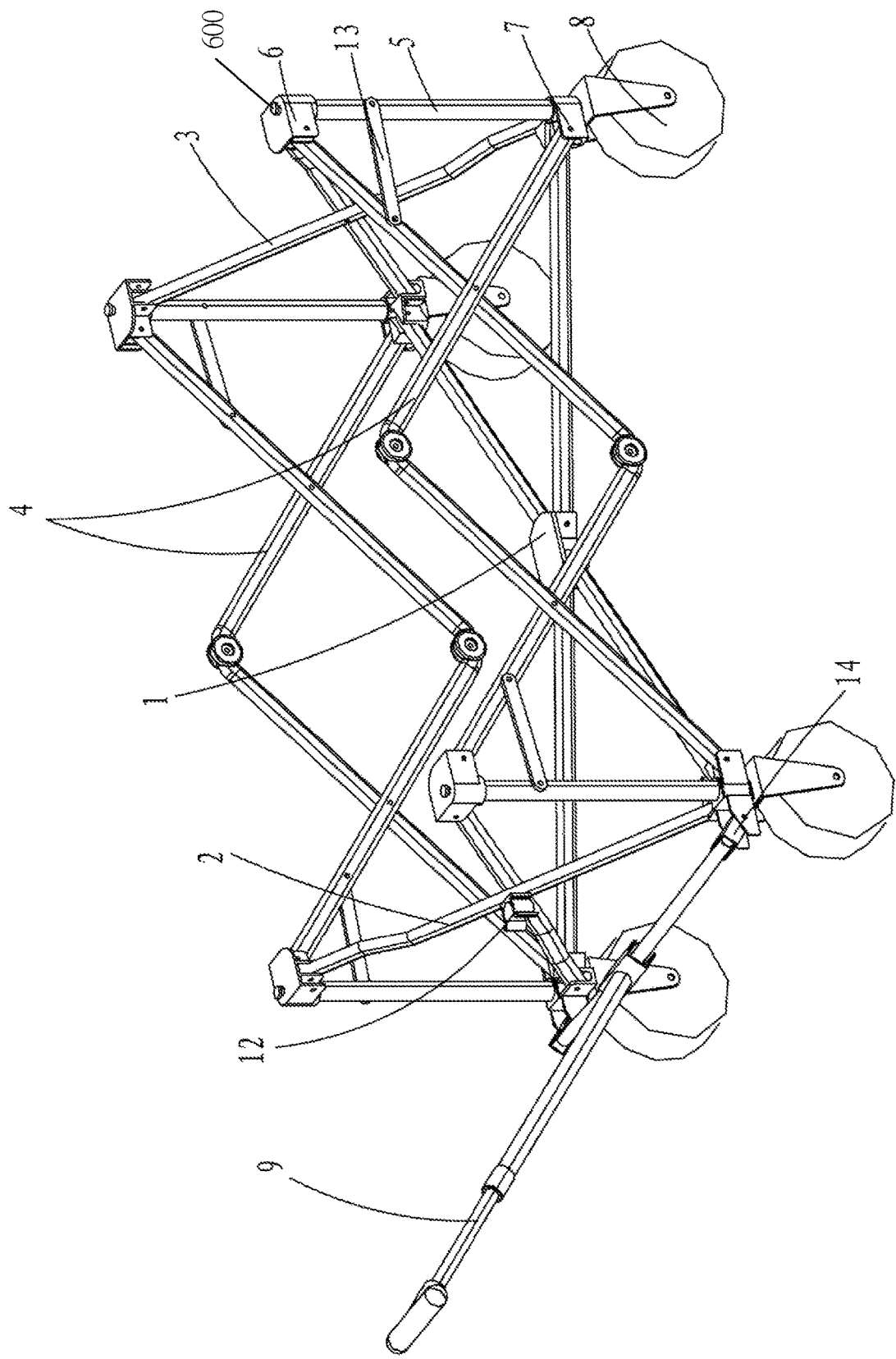
FIG. 20 is a structural schematic diagram of an embodiment 3 in a fully open state.
Figure 21:
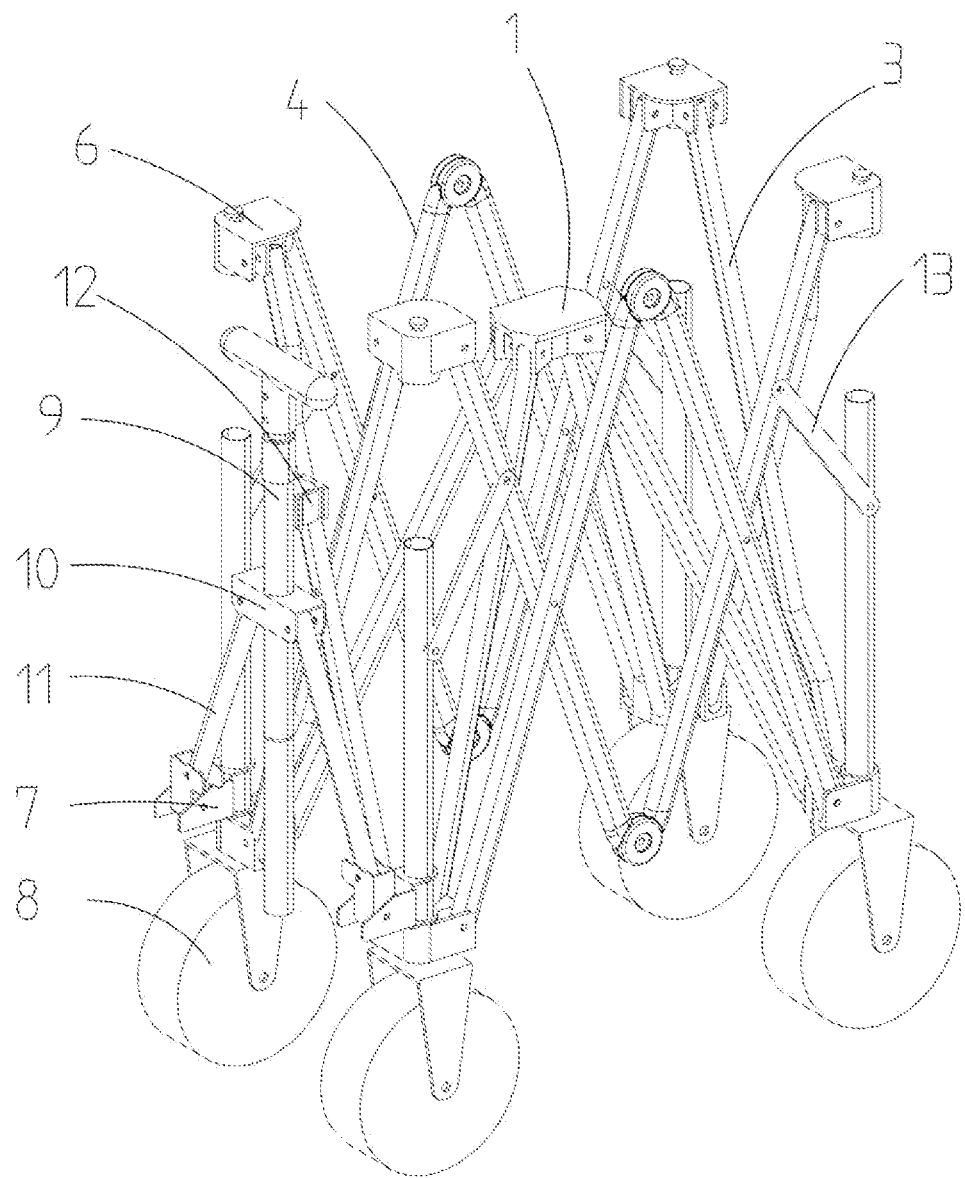
FIG. 21 is a structural diagram of an embodiment 3 in a half-open state.
Figure 22:
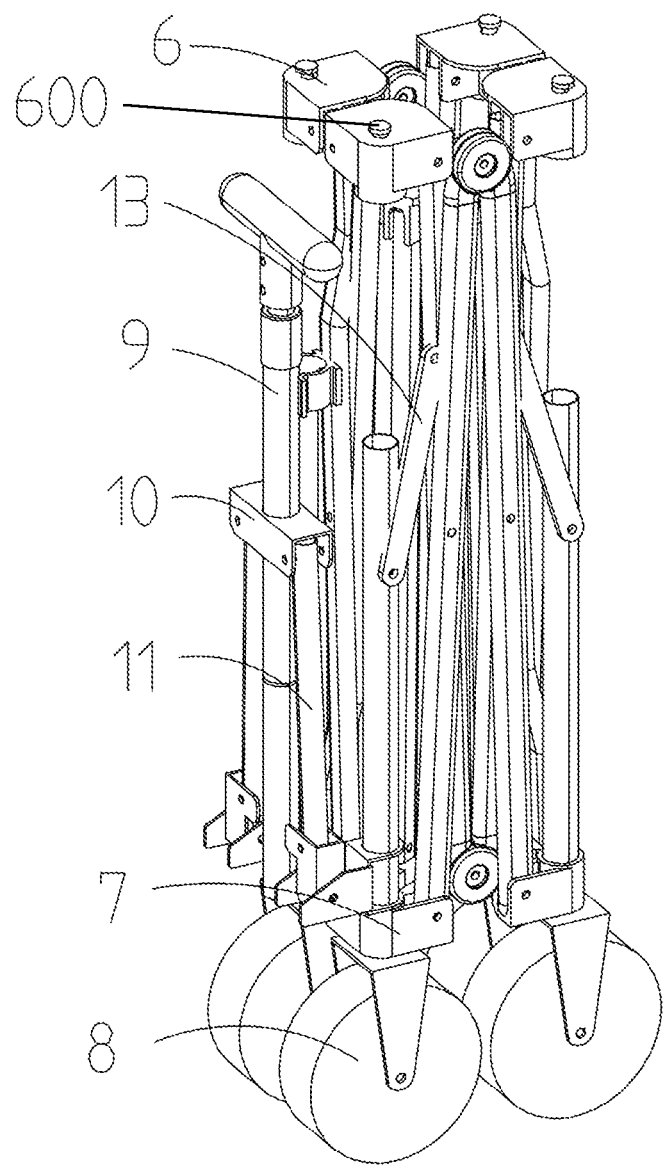
FIG. 22 is a structural schematic diagram of an embodiment 3 in a retracted state.

As shown in FIG. 20 to FIG. 22, the embodiment 3 is optimized in the structure on the basis of the embodiment 2 as follows: the lower hinge seat 7 is provided with support rods 5, and each of the support rods 5 may be provided with 1-4 reinforcing rods 13 as needed. The reinforcing rod 13 may serve to enhance the structural stability, and the specific arrangement is as follows:

Method I. The reinforcing rod 13 is hinged between an upper end and/or a lower end of each of the support rods 5 and the adjacent cross rods on the side folding mechanism 4.

Method II. The reinforcing rod 13 is hinged between the upper ends and/or the lower ends of the support rods 5 in front of the cart and the adjacent cross rods on the front folding mechanism 2, and the reinforcing rod 13 is hinged between the upper ends and/or the lower ends of the support rods 5 behind the cart and the adjacent cross rods on the rear folding mechanism 2.

Method III. The reinforcing rod 13 is hinged between the upper ends and/or the lower ends of the support rods 5 in front of the cart and the adjacent cross rods on the front folding mechanism 2. The reinforcing rod 13 is hinged between the upper ends and/or the lower ends of the support rods 5 in front of the cart and the adjacent cross rods on the side folding mechanism 4. The reinforcing rod 13 is hinged between the upper ends and/or the lower ends of the support rods 5 behind the cart and the adjacent cross rods on the rear folding mechanism 2. The reinforcing rod 13 is hinged between the upper ends and/or the lower ends of the support rods 5 behind the cart and the adjacent cross rods on the side folding mechanism 4.

In the embodiment, a length of the support rod 5 is fixed. When the embodiment is in a fully open state, an upper end of the support rod 5 is in inserted cooperation with the corresponding upper hinged seat 6, and when the embodiment is not in a fully open state, the upper end of the support rod 5 is not in contact with the corresponding upper hinged seat 6.

Compared with the embodiment 1, the embodiment has the advantage of high structural stability.

Embodiment 4

Figure 23:
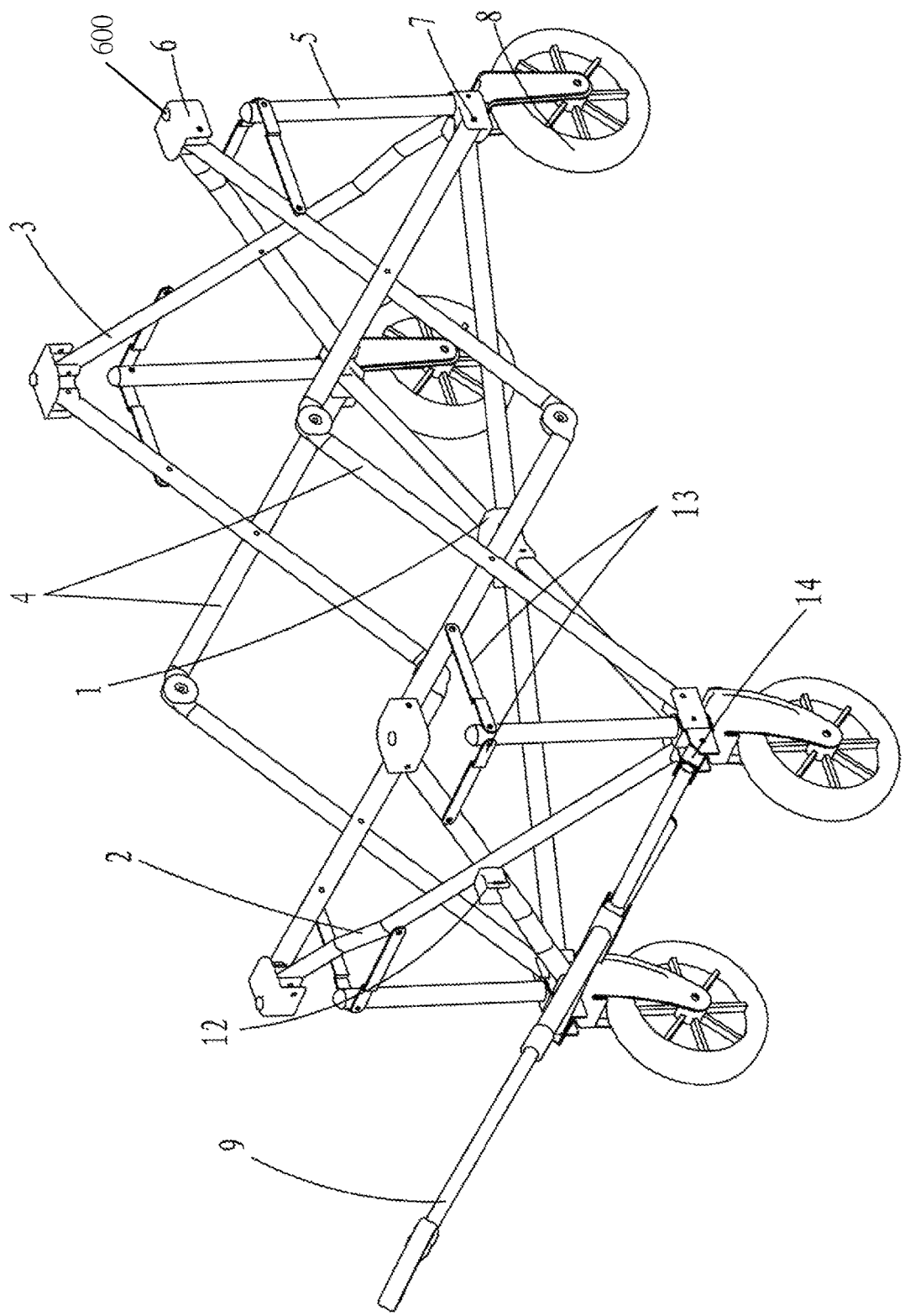
FIG. 23 is a structural schematic diagram of an embodiment 4.

As shown in FIG. 23, the embodiment 4 is optimized in the structure on the basis of the embodiment 2 as follows: the lower hinged seat 7 is provided with support rods 5, and each of the support rods 5 may be provided with 1-4 reinforcing rods 13 as needed. The reinforcing rod 13 may serve to enhance the structural stability, and the specific arrangement is as follows:

Method I. The reinforcing rod 13 is hinged between an upper end and/or a lower end of each of the support rods 5 and the adjacent cross rods on the side folding mechanism 4.

Method II. The reinforcing rod 13 is hinged between the upper ends and/or the lower ends of the support rods 5 in front of the cart and the adjacent cross rods on the front folding mechanism 2, and the reinforcing rod 13 is hinged between the upper ends and/or the lower ends of the support rods 5 behind the cart and the adjacent cross rods on the rear folding mechanism 2.

Method III: the reinforcing rod 13 is hinged between the upper ends and/or the lower ends of the support rods 5 in front of the cart and the adjacent cross rods on the front folding mechanism 2. The reinforcing rod 13 is hinged between the upper ends and/or the lower ends of the support rods 5 in front of the cart and the adjacent cross rods on the side folding mechanism 4. The reinforcing rod 13 is hinged between the upper ends and/or the lower ends of the support rods 5 behind the cart and the adjacent cross rods on the rear folding mechanism 2. The reinforcing rod 13 is hinged between the upper ends and/or the lower ends of the support rods 5 behind the cart and the adjacent cross rods on the side folding mechanism 4.

In the embodiment, a length of the support rod 5 is fixed. The difference from the embodiment 2 is that the support rod 5 of the embodiment is not in contact with the corresponding upper hinged seat 6 regardless of the state (normal working state) where the embodiment is in.

Compared with the embodiment 3, the embodiment has the advantages that the length of the support rod 5 is short, material is saved, and the production cost is lower.

At last, it should be stated that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present invention.

What is claimed is:

1. A folding cart, comprising a frame body and a handle mechanism, the frame body comprising a chassis, four lower hinged seats respectively at four corners of the chassis, a front folding mechanism in front of the chassis, a rear folding mechanism behind the chassis and two side folding mechanisms on a side of the chassis; wherein
    a bottom portion of each of the lower hinged seats is provided with wheels;
    the chassis is of an X-shaped cross-hinged structure, and four end portions of the chassis are respectively hinged to the four lower hinged seats;
    each of the side folding mechanisms comprises at least one X-shaped cross-hinged rod assembly, upper ends of both sides of each of the side folding mechanisms are respectively hinged to upper hinged seats, and lower ends of the both sides of each of the side folding mechanisms are respectively hinged to the corresponding lower hinged seats;
    the front folding mechanism comprises at least one X-shaped cross-hinged rod assembly, with upper ends of both sides respectively hinged to the corresponding upper hinged seats and lower ends of the both sides respectively hinged to the corresponding lower hinged seats;
    the rear folding mechanism comprises at least one X-shaped cross-hinged rod assembly, with upper ends of both sides respectively hinged to the corresponding upper hinged seats and lower ends of the both sides respectively hinged to the corresponding lower hinged seats;
    the handle mechanism comprises a lever, a lever hinged seat disposed on the lever, and two pulling rods respectively hinged to both sides of the lever hinged seat, the lever is slidably inserted into the lever hinged seat, and a lower end of the lever is provided with a lever stopper, so that when the lever is pulled upward, the lever stopper is able to drive the lever hinged seat to move upward, the two pulling rods are respectively hinged to the two lower hinged seats in front of the chassis; and
    the X-shaped cross-hinged rod assembly of the front folding mechanism, of the rear folding mechanism and of the side folding mechanisms comprises two hinged cross rods.

2. The folding cart according to claim 1, wherein the chassis comprises two X-shaped cross-hinged structures, inner ends of left and right sides of the two X-shaped cross-hinged structures are jointly hinged to a first connecting piece, a middle part of each of the side folding mechanisms is provided with a second connecting piece, outer ends of the X-shaped cross-hinged structures are universally hinged to the corresponding lower hinged seats, and when the folding cart is switched from an open state to a contracted state, the X-shaped cross-hinged structures is able to tilt and swing relative to the lower hinged seats, so that the two X-shaped cross-hinged structures are switched from an original horizontal state to a folded state, and the first connecting piece and the second connecting piece are switched from an original buckled state to a separated state.

3. The folding cart according to claim 2, wherein the first connecting piece is a first spherical hinge structure, and the second connecting piece has a first accommodating groove for being buckled with a ball head of the first spherical hinge structure.

4. The folding cart according to claim 2, wherein a second spherical hinge structure is arranged at the outer end of each of the X-shaped cross-hinged structures, and a second accommodating groove for being universally hinged to a ball head of the second spherical hinge structure is arranged on each of the lower hinged seats.

5. The folding cart according to claim 1, wherein the lever is provided with an inserted pin for being in limiting cooperation with the lever hinged seat, a first spring for providing a pressure for the inserted pin, and a control mechanism for pulling the inserted pin.

6. The folding cart according to claim 5, wherein the control mechanism comprises a pull rope for pulling the inserted pin, a pull pin for being connected to the pull rope and a second spring for limiting the pull pin and helping the pull pin to reset.

7. The folding cart according to claim 6, wherein outer ends of cross rods on both sides of the front folding mechanism, of the rear folding mechanism and of the side folding mechanisms are respectively hinged to the corresponding upper hinged seats and the corresponding lower hinged seats.

8. The folding cart according to claim 7, wherein each of the side folding mechanism comprises two X-shaped cross-hinged rod assemblies hinged by ends, upper ends of both sides of the X-shaped cross-hinged rod assemblies are respectively hinged to the two upper hinged seats on the side of the chassis, and lower ends of both sides of the X-shaped cross-hinged rod assemblies are respectively hinged to the two lower hinged seats on the side of the chassis.

9. The folding cart according to claim 7, wherein the front folding mechanism comprises one X-shaped cross-hinged rod assembly, with upper ends of the two cross rods respectively hinged to the two upper hinged seats in front of the chassis, and lower ends of the two cross rods respectively hinged to the two lower hinged seats in front of the chassis, and a position where the two cross rods are hinged is provided with a lever holder, and the lever is snapped onto the lever holder.

10. The folding cart according to claim 7, wherein the rear folding mechanism comprises one X-shaped cross-hinged rod assembly, with upper ends of the two cross rods respectively hinged to the two upper hinged seats behind the chassis, and lower ends of the two cross rods respectively hinged to two lower hinged seats behind the chassis.

11. The folding cart according to claim 1, wherein each of the lower hinged seats is provided with a support rod, and when the folding cart is in a fully open state, the support rod is in inserted cooperation with the corresponding upper hinged seat.

12. The folding cart according to claim 11, wherein a reinforcing rod is hinged between the support rod and the adjacent X-shaped cross-hinged rod assemblies.

13. The folding cart according to claim 1, wherein each of the lower hinged seats is provided with a support rod, and a reinforcing rod is hinged between the support rod and the adjacent X-shaped cross-hinged rod assemblies.

14. The folding cart according to claim 1, wherein each of the upper hinged seats is provided with an abutment portion.

15. The folding cart according to claim 1, wherein the chassis comprises a chassis hinged seat and four chassis connecting rods hinged to the chassis hinged seat, and the four chassis connecting rods are respectively hinged to the corresponding lower hinged seats.

* * * * *